US007668135B2

(12) United States Patent
Verma et al.

(10) Patent No.: US 7,668,135 B2
(45) Date of Patent: Feb. 23, 2010

(54) ENHANCING THE TRAFFIC CARRYING CAPACITY OF TELECOMMUNICATION NETWORKS

(75) Inventors: Pramode K. Verma, Tulsa, OK (US); Yingzhen Qu, Tulsa, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 552 days.

(21) Appl. No.: 11/114,619

(22) Filed: Apr. 26, 2005

(65) Prior Publication Data

US 2005/0237936 A1    Oct. 27, 2005

Related U.S. Application Data

(60) Provisional application No. 60/565,325, filed on Apr. 26, 2004.

(51) Int. Cl.
*H04L 12/26* (2006.01)
(52) U.S. Cl. .................................. 370/329; 370/232
(58) Field of Classification Search ................ 370/232, 370/235, 252, 445, 461
See application file for complete search history.

(56) References Cited

U.S. PATENT DOCUMENTS 6,198,921 B1 * 3/2001 Youssefzadeh et al. ...... 455/428
6,952,396 B1 * 10/2005 Cottreau et al. .............. 370/222

2003/0161268 A1 * 8/2003 Larsson et al. .............. 370/229
2004/0199655 A1   10/2004 Davies et al.
2005/0084267 A1 * 4/2005 Fan et al. ....................... 398/84

OTHER PUBLICATIONS

Birman, A., Kershenbaum, A., "Routing and Wavelength Assignment Methods in Single-Hop All-Optical Networks with Blocking", Infocom '95. Fourteenth Annual Conference of the IEEE Computer and Communications Societies. Bringing Information to People. Proceedings, IEE, vol. 2, 2-6, pp. 431-438, Apr. 1995.
Barry, R. A., Humblet, P.A., "Models of Blocking Probability in All-Optical Networks with and without Wavelength Changers", IEEE journal on selected areas in communications, vol. 14 No. 5, pp. 1-25, figures 1-8, Jun. 1996.
Lemieux, C., "Theory of Flow Control in Shared Networks and Its Application in the Canadian Telephone Network", IEEE Transactions on Communications, vol. 29, No. 4, pp. 399-413, Apr. 1981.
Li, Yunhao, Francisco M. J., Lambadaris I., Huang, D., "Traffic Classification and Service in Wavelength Routed All-optical Networks", Communications, 2003, ICC '03, IEEE International Conference on, vol. 2, 11-15, pp. 1375-1380 May 2003.

(Continued)

*Primary Examiner*—Sam Bhattacharya
(74) *Attorney, Agent, or Firm*—Dunlap Codding, P.C.

(57) ABSTRACT

The present invention relates to methods and systems for enhancing the traffic carrying capacity of telecommunication networks, in particular those involving optical networks and dense wavelength division multiplexing (DWDM).

4 Claims, 20 Drawing Sheets

OTHER PUBLICATIONS

Gong, Y., Lee, P. And Gu, W., "A Novel Adaptive RWA Algorithm in Wavelength-routed Network", Global Telecommunications Conference, 2003, Globecom '03, IEEE, vol. 5,1-5, pp. 2580-2584, Dec. 2003.

Zang, H., Jue, J. P., and Mukherjee, B., "A review of routing and wavelength assignment approaches for wavelength-routed optical WDM networks", Optical Networks Magazine, vol. 1, No. 1, pp. 1-25, Jan. 2000.

Ling Li, Somani, A. K., "Dynamic Wavelength Routing Using Congestion and Neighborhood Information", IEEE, 1999, pp. 779-786.

F. P. Kelly, "Blocking Probabilities in Large Circuit-Switched Networks", Advances in Applied Probability, pp. 473-505, vol. 18, 1986.

Lu Ruan, and Ding-Zhu Du, "Optical Networks—Recent Advances, Lightpath Establishment in Wavelength-Routed WDM Optical Networks", Advances in Optical Networks, pp. 99-122, 2000.

Lu Ruan and Ding-Zhu Du, "Optical Networks—Recent Advances, Wavelenth Assignment Algorithms for WDM Ring Architectures", pp. 19-45, 2001 Kluwer Academic Publishers.

* cited by examiner

ENHANCING THE TRAFFIC CARRYING CAPACITY OF TELECOMMUNICATION NETWORKS

CROSS-REFERENCE TO RELATED APPLICATIONS

The present application claims priority to the provisional application identified by U.S. Ser. No. 60/565,325, filed on Apr. 26, 2004, the entire content of which is hereby expressly incorporated herein by reference.

DETAILED DESCRIPTION OF THE INVENTION

Figure 1:
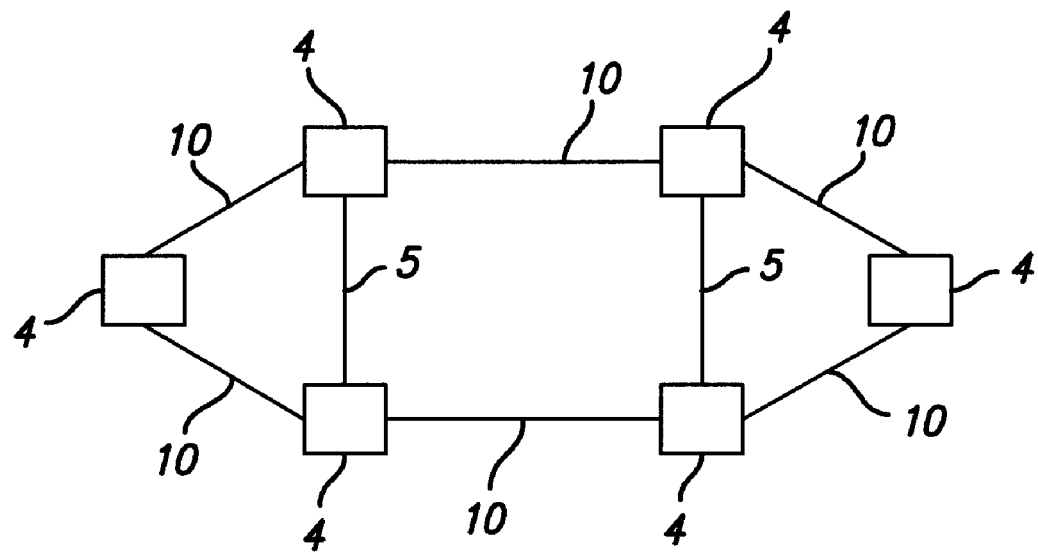
FIG. 1 is a block diagram of a network with a mesh topology.

The various embodiments of the present invention are described in detail in the following embodiments.

In a first embodiment of the invention, the limits on the traffic-carrying capacity of a dense wavelength-division multiplexing (DWDM)-based network are examined. This embodiment presents a technique to maximize the traffic carrying capacity of such networks.

The second embodiment of the invention addresses routing and wavelength assignment problems that occupy a central place in the design of DWDM networks. More recent studies have proposed means to achieve fairness among traffic classes that traverse multiple nodes over a light-path operating under the wavelength continuity constraint. The second embodiment of the invention particularly focuses on the traffic carrying capacity of the network as a whole, and describes a means to enhance the same using techniques of wavebanding and preferential treatment to different classes of traffic. Specifically, this embodiment utilizes example topologies to illustrate the impact of different disciplines on traffic classes.

The third embodiment of the invention discusses the increased usage of Dense Wavelength Division Multiplexing (DWDM) techniques to address exploding demands for bandwidth required by emerging applications on the Internet. This embodiment describes a new algorithm for wavelength management that addresses the Quality of Service (QoS) issue, as measured by the probability of blocking. The impact of the algorithm on the fairness among the different classes of traffic and on the revenue of the network is evaluated. We conclude that the proposed algorithm described in the third embodiment of the invention maximizes network revenue.

The fourth embodiment of the invention describes limits on the traffic carrying capacity of a DWDM-based ring network. This embodiment describes limits for single-hop traffic, multi-hop traffic, as well as total traffic carried by the network under the assumption that the incident traffic among all node-pairs is symmetric. This embodiment, in particular, describes results illustrating the total carried traffic by a ring network as a function of available wavelengths with fixed number of nodes, and as a function of nodes for a fixed number of wavelengths.

The fifth embodiment of the invention describes an additional new algorithm for DWDM-based optical networks. The algorithm described in this embodiment addresses the "fairness problem," for example, providing the acceptable level of blocking to all classes of service, while at the same time maximizing the throughput of the network and the attendant revenue to the service provider that operate the network.

A. First Embodiment

Limits on the Traffic Carrying Capacity of Optical Networks with an Arbitrary Topology

I. Introduction

Emerging Internet applications have given rise to enormous demands for bandwidth. Such demands are effectively met by using dense wavelength-division multiplexing (DWDM) techniques. A DWDM-based network could have, in general, any network topology, e.g., a linear, ring, or mesh configuration. In general, incident traffic on a node will traverse one or more physical links to reach its destination. Each physical link in the network will have a number of DWDM wavelengths (or virtual channels). For any traffic to be carried by the network, it must be able to find an available wavelength on each of the physical links. Traffic could be either single or multi-hop depending upon whether it uses one or more physical links between the source and the destination.

We consider the incident traffic to be arbitrarily distributed among all the source-destination pairs of the network. In other words, we place no restriction on the traffic matrix that characterizes the network. We do, however, for purpose of analysis assume that changes in the incident traffic are proportionally reflected among all node pairs. This assumption is specifically made to compute the capacity of the network to serve traffic. The carried traffic is used as the primary measure in evaluating the network. We note that from the network provider's point of view, it is the carried traffic that results in revenue.

We consider a mesh topology 1 as an example. In general, the mesh topology 1 includes a plurality of nodes 4 that are interconnected by a plurality of physical communication links designated as 5 and 10. We develop limits on the total traffic-carrying capacity of the network as well the components of the carried traffic, namely, the single-hop traffic, the two-hop traffic, the three-hop traffic, etc. The description of this embodiment is organized as follows. Section II presents the mathematical model and base results applicable to any topology. Section III presents an example that has a mesh topology. Section IV captures our conclusions.

TABLE I

NOTATIONS USED IN THIS PAPER

| | |
|---|---|
| N | Number of nodes in the network |
| $w_{ij}$ | Number of available wavelengths on the link between two adjacent nodes i and j ($w_{ij} \geq 1$) |
| A | The total incident traffic intensity in Erlangs |
| $a_{sd}A$ | The intensity of traffic incident on node s, destined to node d. Obviously, $\sum_s \sum_d a_{sd} = 1$ |
| $l_{ij}A$ | The (incident) traffic intensity on the link between adjacent nodes i and j. Note that $l_{ij}A$ is not the traffic carried by the link ij. The carried traffic will in general be lower than the incident traffic. |
| $p_{ij}$ | Blocking probability of the link between adjacent nodes i and j |

TABLE I-continued

NOTATIONS USED IN THIS PAPER

| | |
|---|---|
| $P_{sd}$ | Blocking probability of the route from source node s to destination node d |
| C | The total traffic carried by the network, $A \geq C$ |
| $C_{sd-h}$ | Traffic carried between the source-destination pair s and d with h hops. Obviously $\sum_k C_{sd-k} \leq a_{sd}A$ |

Recent studies [A-1]-[A-4] have reported that traffic requiring a large number of hops between the source and the destination suffers a higher blocking probability. Since blocked traffic does not result in any network revenue, it's important to maximize the traffic carrying capacity of the network under all situations. We first compute the carried traffic that is one-hop, two-hop, three-hop, etc. We then derive the total traffic carried by the network under varying degrees of the incident traffic. The total traffic carried by the network is the sum of all such traffic classes.

We make the following assumptions.

The connection requests are Poisson distributed.

The connection time is exponentially distributed.

There is no buffer in the system, i.e., blocked traffic is lost.

The incident traffic intensity among all node-pairs increases proportionately

Under these conditions, the Erlang B formula can be used to compute the probability of blocking, $E_n(A)$. We have:

$$E_n(A) = \frac{\frac{A^n}{n!}}{\sum_{k=0}^{n} \frac{A^k}{k!}} \quad (1)$$

where n is the number of trunks, or equivalently, the number of wavelengths. We define the following notations in Table I.

We now prove two important results as Theorems 1 and 2.

Theorem 1: For a network of arbitrary topology, as the incident traffic intensity increases, the carried single-hop traffic between source-destination node pair increases until it reaches a finite limit.

Proof: The blocking probability of the link between adjacent nodes and is:

$$p_{ij} = E_{w_{ij}}(l_{ij}A) = \frac{\frac{(l_{ij}A)^{w_{ij}}}{w_{ij}!}}{\sum_{k=0}^{w_{ij}} \frac{(l_{ij}A)^k}{k!}} \quad (2)$$

The carried single-hop traffic between adjacent node i and node j is:

$$C_{ij-1} = a_{ij}A \times (1 - p_{ij}) = \frac{a_{ij}A + \ldots + \frac{a_{ij}l_{ij}^{w_{ij}-1}A^{w_{ij}}}{(w_{ij}-1)!}}{1 + \ldots + \frac{(l_{ij}A)^{w_{ij}}}{w_{ij}!}}. \quad (3)$$

It can be easily seen from (3) that
From (4), we can see the $$\lim_{A \to \infty} C_{ij-1} = \frac{w_{ij}a_{ij}}{l_{ij}}. \quad (4)$$

single-hop traffic goes to a limit, which is given in (4). Note that $l_{ij}A$ may not generally be characterized as Poissonian even when $a_{sd}A$ is Poissonian. Equation (2) is thus an approximation.

Theorem 2: For a network of arbitrary topology, as the incident traffic intensity increases, the carried multi-hop traffic (i.e., traffic with two or more hops) between any source-destination node-pair increases, but eventually goes to zero, after reaching a peak.

Proof: Let nodes s, l, m . . . n and d be along the route from s to d. The blocking probability from node s to node d is $$P_{sd} = 1 - (1-p_{sl})(1-p_{lm}) \ldots (1-p_{nd}). \quad (5)$$

The carried multi-hop traffic from node s to node d is $$C_{sd-h} = a_{sd}A \times (1 - P_{sd-h}) \quad (6)$$
$$= a_{sd}A \times (1 - p_{sl}) \ldots (1 - p_{nd})$$
$$= a_{sd}A \frac{\sum_{k_1=0}^{w_{sl}-1} \frac{(l_{sl}A)^{k_1}}{k_1!}}{\sum_{k_1=0}^{w_{sl}} \frac{(l_{il}A)^{k_1}}{k_1!}} \ldots \frac{\sum_{k_h=0}^{w_{nd}-1} \frac{(l_{nd}A)^{k_h}}{k_h!}}{\sum_{k_h=0}^{w_{nd}} \frac{(l_{nj}A)^{k_h}}{k_h!}}$$
$$= \frac{a_{sd}A + \ldots + d_1 A^{w_{sl}+w_{lm}+\ldots+w_{nd}-h+1}}{1 + \ldots + d_2 A^{w_{sl}+w_{lm}+\ldots+w_{nd}}}.$$

For a given topology and traffic matrix, $d_1$ and $d_2$ are constants. Since $h > 1$, for multi-hop traffic, we have, $$\lim_{A \to \infty} C_{sd-h} = 0. \quad (7)$$

Also, according to Rolle's Theorem [A-5], $C_{sd-h}$ must reach a peak before it goes to zero as A becomes indefinitely large. So, as the incident traffic intensity increases, the carried multi-hop traffic also increases before it reaches the peak, and after that it drops to zero. This means that after the peak, the multi-hop traffic continues to consume network resources without a corresponding increase in the throughput. We now present the following corollary.

Corollary: For any network topology, when the incident traffic intensity is arbitrarily large, the network can carry only single-hop traffic.

Proof:

$$\lim_{A \to \infty} C = \lim_{A \to \infty} (C_1 + C_2 + \cdots C_{h_{max}}) = \lim_{A \to \infty} C_1, \quad (8)$$

Since $\lim_{A \to \infty} C_h = 0$, when $h \geq 2$.

III. Numerical Example Using a Mesh Topology

In this section, we consider a network with mesh topology, as presented in FIG. 1. The number of available wavelengths on each link is indicated in the diagram. In a mesh topology, it is possible that there are multiple routes between any given source-destination nodes. Routing mechanism in this case is not as simple as in a linear bus or a ring topology, where the shortest routing is assumed. In order to simplify calculations, we assume a fixed routing. Table II presents the routes for all possible node-pairs and the corresponding incident traffic; as before, consider traffic flow in one direction only.

TABLE II

ROUTING AND TRAFFIC THE MESH TOPOLOGY

| | 1 | 2 | 3 | 4 | 5 | 6 |
|---|---|---|---|---|---|---|
| 1 | | 1-2/1.5 | 1-2-3/1 | 1-2-3-4/0.8 | 1-6-5/1.2 | 1-6/1 |
| 2 | | | 2-3/1 | 2-3-4/1.3 | 2-6-5/0.9 | 2-6/1.1 |
| 3 | | | | 3-4/1.1 | 3-5/1.3 | 3-5-6/0.7 |
| 4 | | | | | 4-5/0.9 | 4-5-6/1 |
| 5 | | | | | | 5-6/1.4 |
| 6 | | | | | | |

Figure 2:
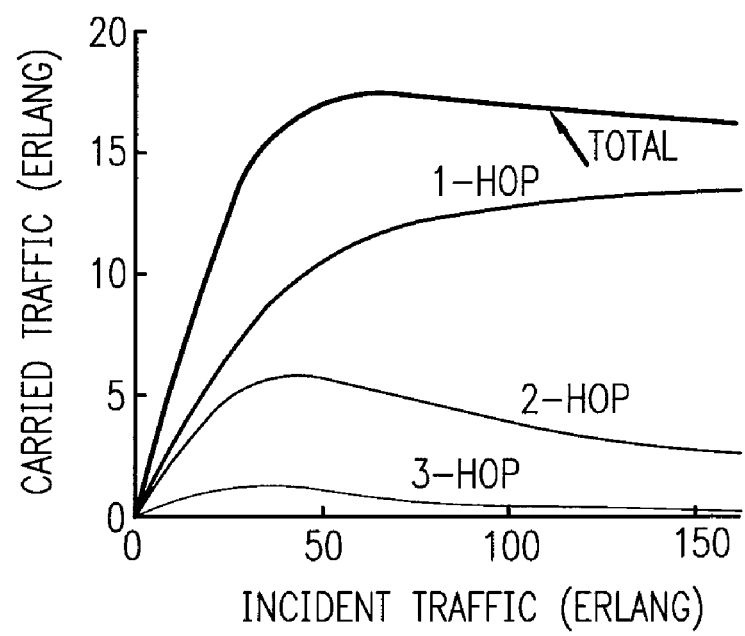
FIG. 2 is a graph of a carried traffic versus the incident traffic on the network of FIG. 1.

From the given routing and traffic matrix in Table II, we can calculate the incident traffic intensity on each fiber link, and then the blocking probability of the link using (2). FIG. 2 shows the carried traffic of the mesh network using the methodology presented in Section II.

In [A-6], the author has pointed out that, in telecommunication networks, there is an overload point, which is a key load level. Beyond the overload point, the throughput of the network decreases rapidly even as the incident traffic increases. Although the overload point mentioned in [A-6] is based on empirical observations, this embodiment of the invention has mathematically proved its existence for an arbitrary topology.

Both the mathematical derivation and example topology show that, for an optical network with any arbitrary topology, the total carried traffic first increases as the incident traffic increases, but it drops to the same limit as the carried single-hop traffic. Conceptually, it happens because the probability of finding a free wavelength on each of two or more consecutive hops reaches a value close to zero much faster than the corresponding probability of availability of a wavelength on a single hop. Multi-hop traffic can be blocked even after it has found available wavelengths on some of the links, but not on all of them. It thus consumes network resources without resulting in any throughput. It follows that under this case, i.e., when the network is heavily congested, we should avoid wasting the network resources by multi-hop traffic. In order to achieve this objective, we can predefine the routes and wavelengths for multi-hop traffic, i.e., resort to a fixed routing and wavelength assignment. The problem with fixed routing and wavelength assignment is that when the incident traffic is low, it is not as efficient as when all the wavelengths are shared by all traffic classes. So when the traffic is low, the network should share all the available wavelengths, and switch to fixed routing and wavelength assignment when the incident traffic intensity is high enough to cause congestion or result in lowered throughput even as the incident traffic increases.

Figure 3:
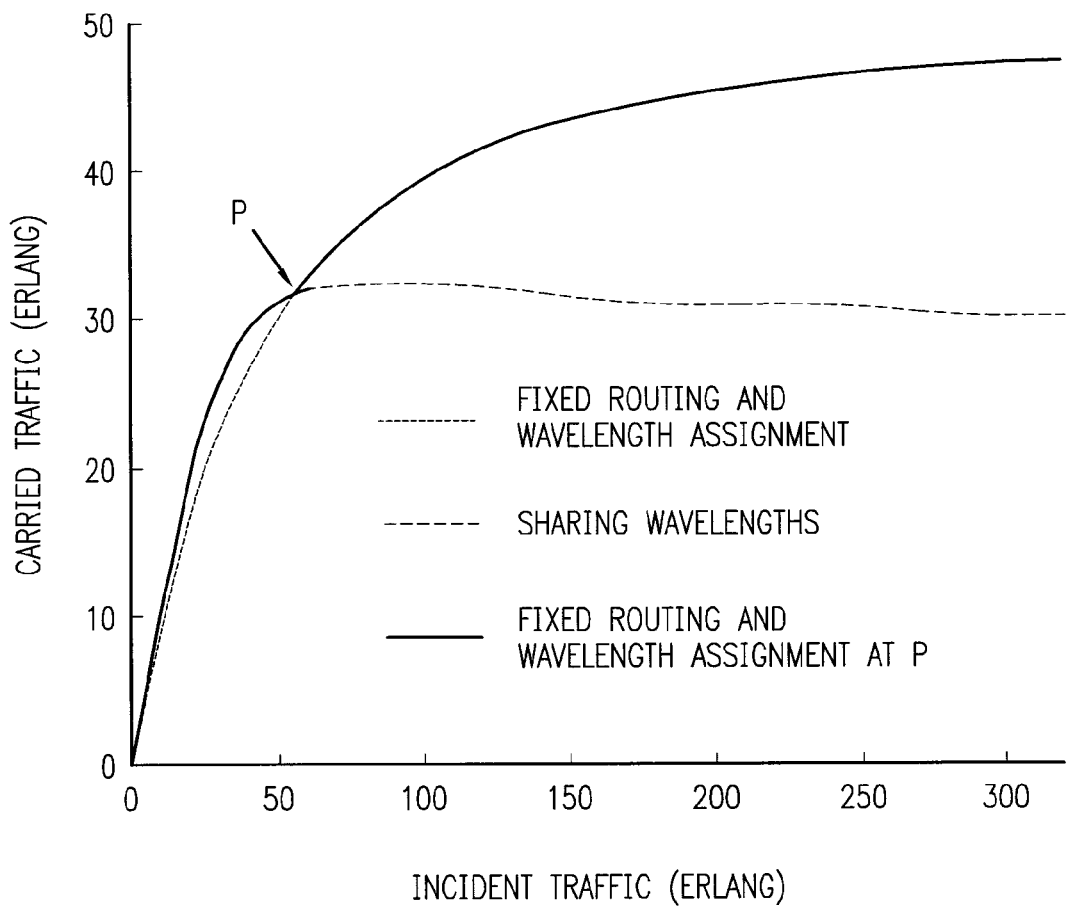
FIG. 3 is a graph of the carried traffic versus the incident traffic on the network of FIG. 1 with fixed routing and wavelength assignment.

FIG. 3 shows the carried traffic of the example network as the incident traffic increases. We introduce fixed routing and wavelength assignment at point P. Beyond the Point P, in the absence of fixed routing and wavelength assignment, the network throughput rapidly reduces, while introduction of the fixed routing and wavelength assignment at P results in the carried traffic holding steady as the incident traffic increases.

Although this embodiment has been presented in the context of an optical network, the results presented here are equally applicable to any circuit-switched network. In the latter case, a wavelength will map into a trunk.

IV. Conclusion

The traffic carried by a DWDM network is the sum of traffic that transits through a single or multiple numbers of hops as it reaches its destination. In this embodiment of the invention, we have shown that as the incident traffic increases, the carried multi-hop traffic reaches a peak and then drops to zero, while the carried single-hop traffic goes to an asymptotic limit. We have also shown that when the incident traffic intensity of the network is arbitrarily high, the network can carry only single-hop traffic. The multi-hop traffic consumes network resources but does not result in any throughput of the network when the incident traffic intensity is very high.

B. Second Embodiment

Enhancing the Carrying Capacity of a DWDM Network

1. Introduction

As demand for bandwidth increases, the optical technology increasingly becomes the technology of choice for telecommunication networks. In an all-optical network, signals are transmitted from the source node to the destination node without being converted into the electrical domain. The DWDM (Dense Wavelength Division Multiplexing) technology has increased the bandwidth of a fiber by two-to-three orders of magnitude by allowing the simultaneous transmission of multiple wavelengths. A DWDM network consists of optical add-drop multiplexers (OADMs) and/or optical cross-connects (OXCs) connected by optical fiber links. A light-path is an optical path established between two nodes that creates a bandwidth equivalent to a single or multiple wavelengths between them. There are two steps involved in establishing a light-path in DWDM networks: routing and wavelength assignment (RWA). Routing finds a route from the source node to the destination node. Wavelength assignment assigns a single wavelength or a set of wavelengths to the route. A connection request is said to be blocked if there is no free wavelength on the available paths between the corresponding node pair. The RWA problem has been extensively studied [1-3, 6]. The objective of RWA is to maximize the number of connections that are established in the network at any time within the constraint of a fixed number of available wavelengths.

This embodiment of the invention focuses on the traffic carrying capacity of the network as a whole, and it proposes means to enhance the same using techniques of wavebanding and preferential treatment to different classes of traffic. We use example topologies to illustrate the impact of different disciplines on traffic classes. The description of this embodiment 7 is organized as follows: The next section, Section 2, reviews the fairness problem discussed in a recent paper [B-2, B-5, B-9]. In Section 3, we propose a new method to enhance the carrying capacity of an all-optical network as a whole. Section 4 illustrates its efficacy with example topologies. We present our conclusion in Section 5.

2. Classes of Traffic and Fairness

Recent studies [B-1, B-5] have reported that traffic requiring a larger number of hops between the source and the destination suffers a higher blocking probability. This has been referred to as the fairness problem. Among the means to address fairness is the technique of protection threshold [B-5], where the single-hop traffic is assigned an idle wavelength only if the number of idle wavelengths on the link is at or above a given threshold. Since the blocking probability grows fast as the number of hops increases, in order to obtain the same quality of service on the multi-hop traffic as the single-hop traffic, the multi-hop traffic route has to be "protected".

In [B-2], the traffic classification and service (ClaServ) method was proposed to solve the fairness problem. The traffic requests are classified depending on the number of hops from the source node to the destination node. The classified traffic requests receive different levels of priority, providing preferential treatment to multi-hop traffic. Reference [B-2] uses Waveband Access Range and Waveband Reservation methods to achieve acceptable blocking probability for multi-hop traffic, resulting in multi-hop traffic occupying more wavebands.

3. Service and Hops (S-Hops) Method

In this embodiment of the invention, we focus on increasing the traffic carrying capacity of the network as a whole, as opposed to equalizing the blocking probability of different classes of traffic. Our rationale is as follows: When the network is lightly loaded, all classes of traffic will experience an acceptable grade of service. The importance of instituting any fairness scheme comes into play when the network is subjected to higher levels of traffic. Under these busy-period conditions, giving preferential treatment to classes of traffic destined to travel an optical path consisting of several physical links or hops will actually reduce the overall probability of completed calls from the perspective of the network. In other words, under busy-period traffic conditions, giving preferential treatment to single-hop traffic will actually increase the overall carrying capacity of the network [B-7], as well as the network revenue. While this might sound counterintuitive, it is important to remember that congestion on even a single link for a multi-hop traffic will reduce the probability of successful transmission to zero. The single-hop traffic, on the other hand, will be served if it can find an available wavelength within the single physical link that connects it to its destination node.

In this embodiment, we propose a Service and Hops (S-Hops) method, which also classifies traffic requests according to the number of hops from the source to the destination node. There is a waveband specified for each class of traffic. A connection request searches its own specific waveband corresponding to its traffic class for available wavelengths. If all the wavelengths in a certain waveband have been fully occupied, the connection request goes to the waveband reserved for the next higher class of traffic.

4. Analysis of Example Topologies

We use two example topologies, a linear and a ring topology, to illustrate the technique.

4.1 Example 1

A Linear Bus Topology

We first consider (FIG. 4) a simple linear physical topology with three nodes connected by several wavelengths.

We make the following assumptions:

Each physical link has 10 bi-directional wavelengths available.

The traffic is uniformly distributed among all node pairs.
The connection requests are Poisson distributed.
The connection time is exponentially distributed.
There is no buffer, i.e., blocked traffic is lost.
In each waveband, the first-fit heuristic is used for wavelength assignment [B-4, B-8].

Under these assumptions, the Erlang B formula can be used to compute the probability of blocking, $E_n(A)$. We have:

where A=Traffic intensity in $$E_n(A) = \frac{\frac{A^n}{n!}}{\sum_{k=0}^{n} \frac{A^k}{k!}} \quad (1)$$

4.1.1. Blocking Probability

Figure 4:
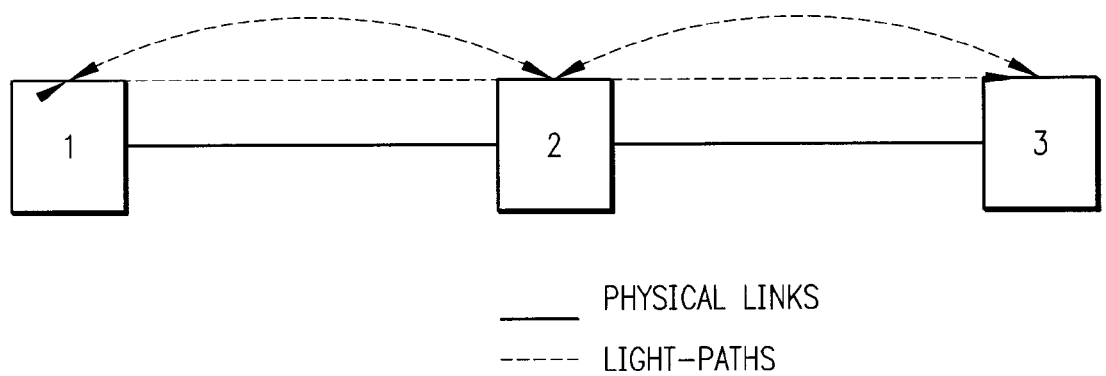
FIG. 4 is a block diagram of a linear bus with three nodes.

First, we calculate the blocking probability without wavebanding. We assume the traffic intensity for each light-path is A in Erlangs. In FIG. 4, there are three light-paths: 1-2, 2-3 and 1-3. The light-paths are shown as dashed lines. The first two of them are single-hop paths, and the last is a two-hop path.

The blocking probability of one-hop traffic can be written as:

$$P_1 = E_{10}(2A) \quad (2)$$

Equation (2) follows from the fact that on any physical link the traffic intensity is 2 A if A is the traffic intensity between any two node-pairs: 1-2, 1-3, and 2-3.

The blocking probability of two-hop traffic is:

$$P_2 = 1-(1-P_1) \times (1-P_1) \quad (3)$$

We now divide the 10 wavelengths into 2 wavebands, each with 5 wavelengths. In ClaServ method [B-2], the first waveband serves both the one-hop and two-hop traffic. After the first waveband is fully occupied, any additional traffic that is two-hop is offered to the second waveband; the one-hop traffic is blocked. Using the ClaServ method and the Erlang B formula, we can now calculate the blocking probabilities as following.

Traffic intensity for the first waveband:

$$A_1 = 2A \quad (4)$$

Blocking probability for one-hop traffic:

$$P_1' = E_5(A_1) \quad (5)$$

Traffic intensity for the second waveband:

$$A_2 = A \times P_1' \quad (6)$$

Blocking probability for two-hop traffic:

$$P_2' = 1-(1-E_5(A_2) \times P_1')(1-E_5(A_2) \times P_1') \quad (7)$$

Figure 5A:
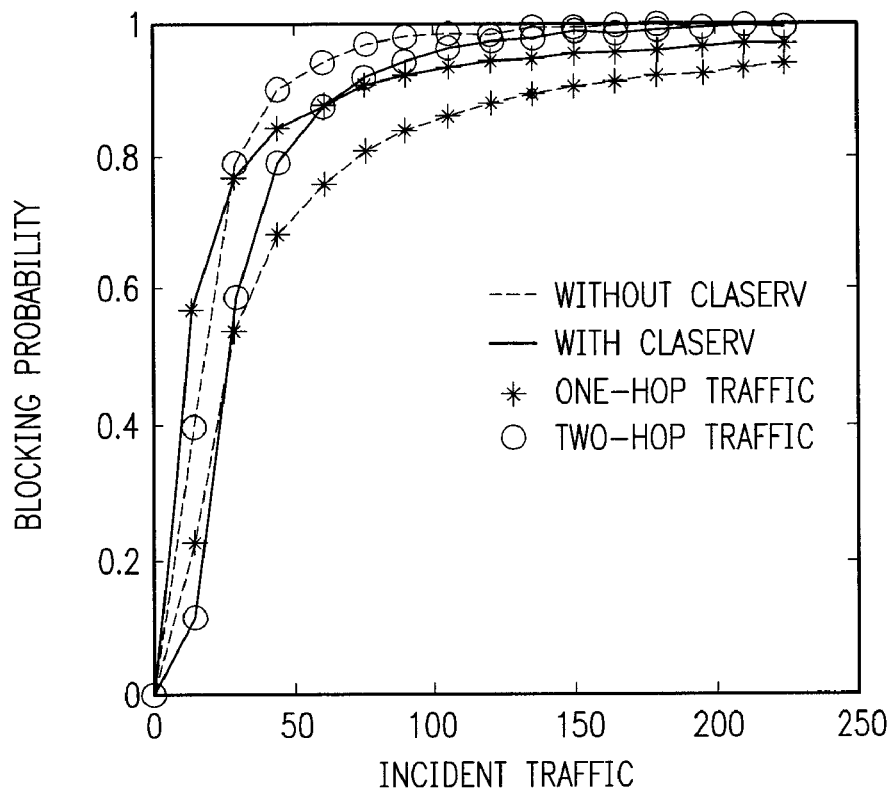
FIGS. 5A and 5B are graphs of the blocking probability versus the incident traffic on the linear bus of FIG. 4, with and without the ClaServ method.
Figure 5B:
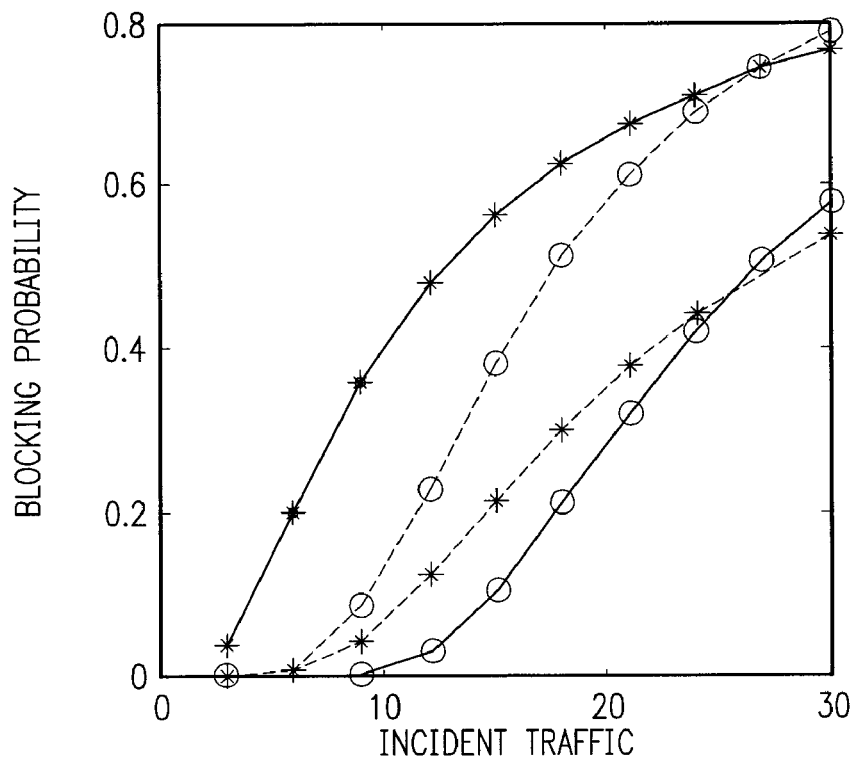
Figure 6A:
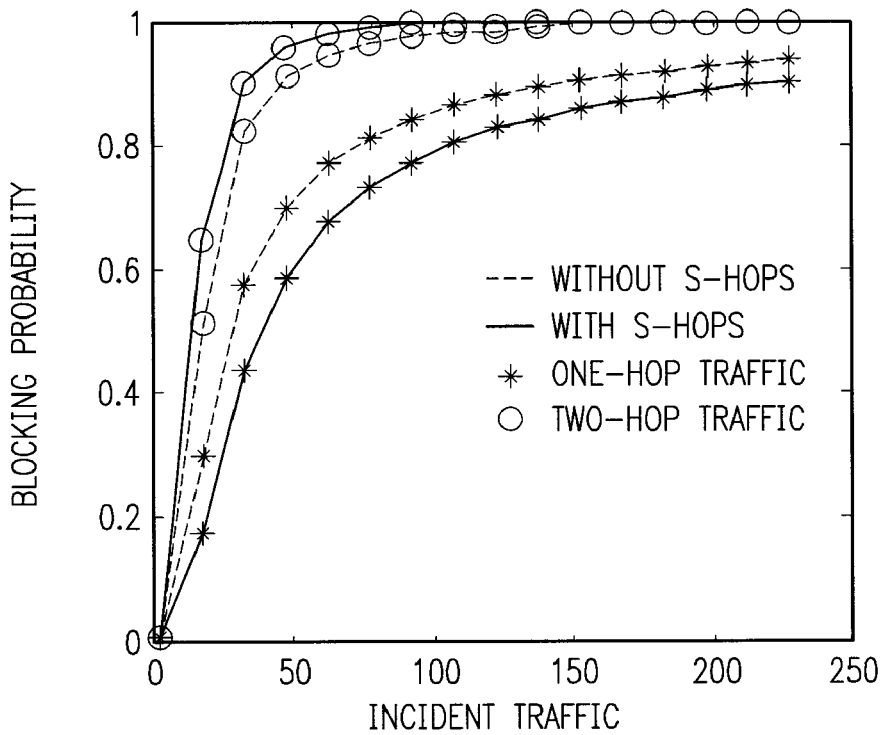
FIGS. 6A and 6B are graphs of the blocking probability versus the incident traffic on the linear bus with and without the S-Hops method of the present invention.
Figure 6B:
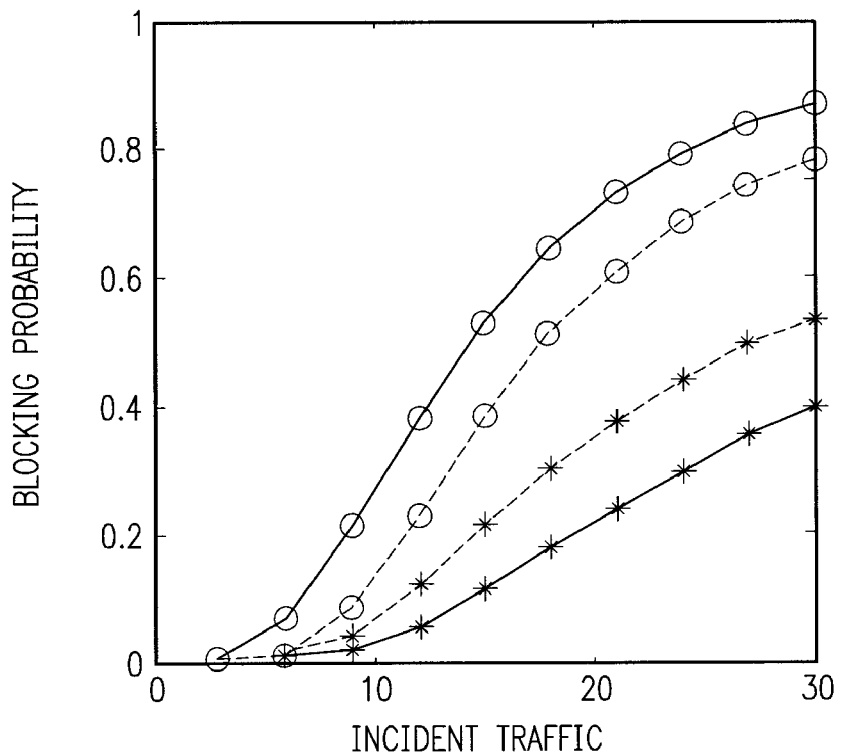

FIG. 5 plots blocking probability as a function of traffic intensity; different ranges of the traffic intensity are plotted in FIGS. 5A and 5B.

From FIG. 5, it is easy to see that when the traffic intensity is high, the ClaServ Method [B-2] can lower the blocking probability of two-hop traffic at the cost of increasing the blocking probability of one-hop traffic. Thus the ClaServ method does address the fairness problem when traffic intensity is high. But under normal operating conditions, when both one-hop and two-hop traffic have blocking probabilities less than 0.2, the one-hop traffic has a much higher blocking probability than the two-hop traffic, see FIG. 5B.

Using the same network topology as in FIG. 4, but using the S-Hops method, we will have the following assignments: If all the wavelengths for one-hop traffic from node 1 to node 2 are occupied, and there are still available wavelengths in the waveband for two-hop traffic, the one-hop connection request will utilize the available wavelengths for two-hop traffic.

We can compute the blocking probabilities for the two class of traffic (as in FIG. 4), using the S-Hops discipline as follows.

The blocking probability of the waveband 1 for one-hop traffic:

$$P_{w1} = E_5(A) \quad (8)$$

If there is no overflow one-hop traffic, the blocking probability of the waveband for two-hop traffic is:

$$P_{W2_1} = E_5(A) \quad (9)$$

Once the first waveband is fully occupied, the traffic intensity of the waveband for two-hop traffic becomes:

$$A' = A + A \times P_{w1} \quad (10)$$

If there is overflow one-hop traffic, the blocking probability of the waveband for two-hop traffic is:

$$P_{W2_2} = E_5(A') \quad (11)$$

The blocking probability of the waveband for two-hop traffic:

$$P_{w2} = P_{w2_1} \times (1-P_{w1}) + P_{w2_2} \times P_{w1} \quad (12)$$

So the blocking probability for one-hop traffic is:

$$P_1'' = P_{w1} \times P_{w2} \quad (13)$$

The blocking probability for two-hop traffic is:

$$P_2'' = 2 \times P_{w2} - P_{w2} \times P_{w2} \quad (14)$$

Equation (13) and (14) apply to the proposed S-Hops discipline.

From Figure B-3, we can see that with the S-Hops method, the blocking probability of one-hop traffic is lowered, but two-hop traffic has a higher blocking probability.

4.1.2 Network Traffic Carrying Capacity

We now compute the actual traffic carried by the network. The service provider has a high level of motivation to maximize the traffic carried by the network because blocked traffic does not produce any revenue for the carrier.

By a close inspection of the topology and the assumptions we have already made, we can see that:

Carried traffic of the network without ClaServ or S-Hops:

$$C = 3 \times A - (2 \times A \times P_1 + A \times P_2) \quad (15)$$

Carried traffic of the network with ClaServ:

$$C' = 3 \times A - (2 \times A \times P_1' + A \times P_2') \quad (16)$$

Carried traffic of the network with S-Hops:

$$C'' = 3 \times A - (2 \times A \times P_{1''} + A \times P_{2''}) \quad (17)$$

Figure 7:
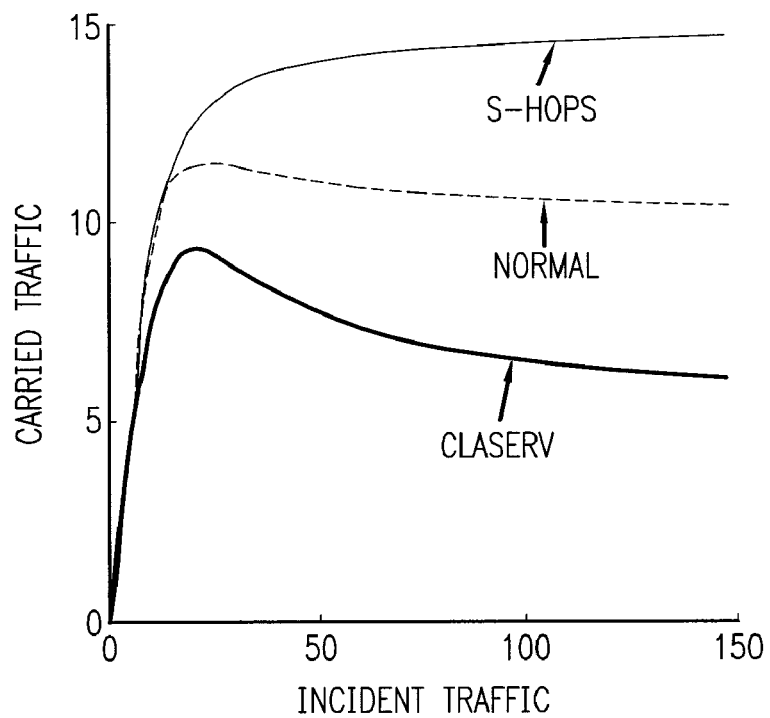
FIG. 7 is a graph of the carried traffic versus the incident traffic of the linear bus of FIG. 4, for each of the normal, ClaServ, and S-Hops methods.

The resulting values of the carried traffic under the three conditions are plotted in FIG. 7. We can see from FIG. 7 that with the S-Hops method the network can carry the most traffic under all conditions, especially when the incident traffic intensity is high.

4.1.3 Network Revenue

Figure 8:
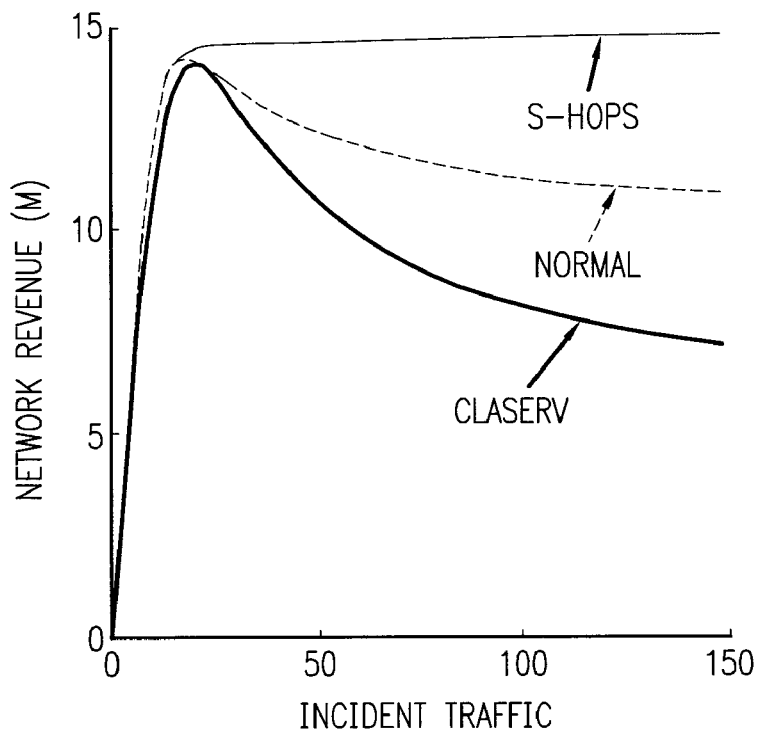
FIG. 8 is a graph of the network revenue versus the incident traffic of the linear bus of FIG. 4, for each of the normal, ClaServ, and S-Hops methods.

From the service provider's point of view, another important measure to test whether an algorithm is good or not is to see the network revenue achieved by the algorithm. We assume that for completed call connections, the service revenue is $ M/(Erlang*Hop). The network revenue of the linear bus with different algorithms is shown in FIG. 8 under various incident traffic conditions.

4.2 Example 2

A Ring Topology

Figure 9:
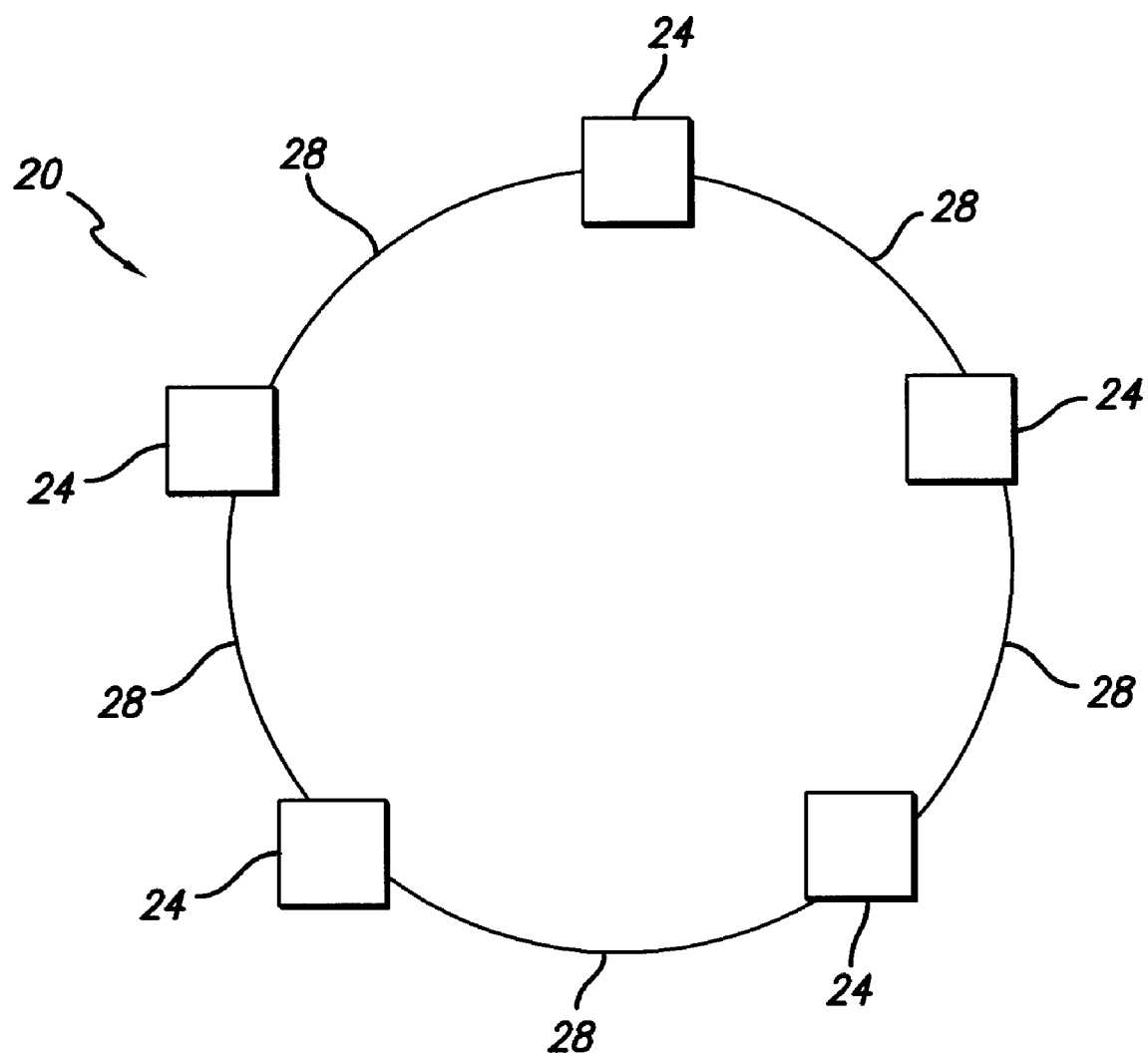
FIG. 9 is a block diagram of a 5-node ring network
Figure 10A:
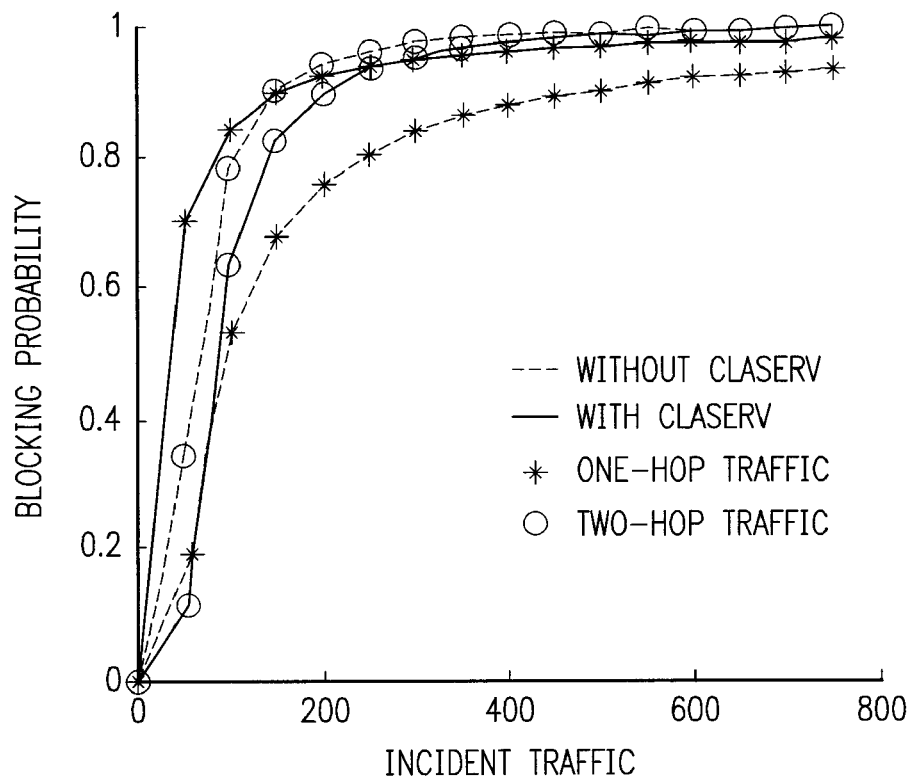
FIGS. 10A and 10B are graphs of the blocking probability versus the incident traffic on the network of FIG. 9, with and without the ClaServ method.
Figure 10B:
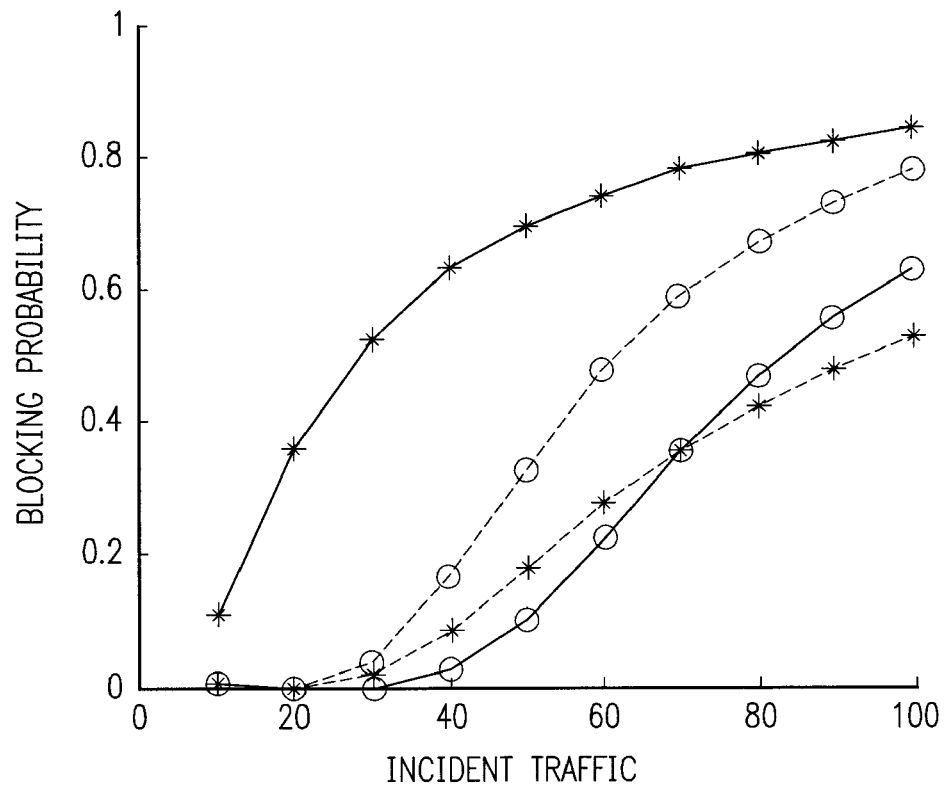

We now consider another example. Physically, it is a five-node ring 20, shown in FIG. 9. In general, and as shown in FIG. 9, the five-node ring 20 includes five nodes 24 interconnected by physical communication links 28. For this topology, we make the same assumptions as in the previous example except for the number of available wavelengths on each physical link, which we assume to be 15. For routing, we assume the shortest routing method is used, so there are two classes of traffic in this network, one-hop and two-hop. For example, traffic from node 1 to node 5, according to the shortest routing, goes counterclockwise, and it is one-hop traffic. Traffic from node 1 to node 4 also goes counterclockwise, but it has to pass node 5, so it is two-hop traffic. We also assume that the amount of one-hop traffic equals that of two-hop traffic. We divide the available 15 wavelengths into two wavebands, one has 5 wavelengths for one-hop traffic, and the other has 10 wavelengths for two-hop traffic.

4.2.1 Blocking Probability

With similar arguments as the example in Section 4.1, we can derive the appropriate formulas for the ring topology as follows:

The blocking probability of one-hop traffic without ClaServ or S-Hops is:

$$P_1 = E_{15}(3A) \quad (18)$$

Equation (18) follows from the fact that a typical physical link, say link 1-2, carries single-hop traffic between node 1-2; and two-hop traffic between nodes 5-2 and 1-3, leading to a traffic intensity of 3A on the link.

The blocking probability of two-hop traffic without ClaServ or S-Hops is:

$$P_2 = 2 \times E_{15}(3A) - E_{15}^2(3A) \quad (19)$$

The blocking probability of one-hop traffic with ClaServ is:

$$P_1' = E_5(3A) \quad (20)$$

The blocking probability of two-hop traffic with ClaServ is:

$$P_2' = E_5(3A) \times E_{10}(2A \times E_5(3A)) \times 2 - (E_5(3A) \times E_{10}(2A \times E_5(3A)))^2 \quad (21)$$

Next we apply the S-Hops method to the 5-node ring as shown in FIG. 9. Based on the same assumptions as earlier, we can derive the blocking probabilities with the S-Hops method as follows.

The blocking probability of one-hop traffic with S-Hops is:

$$P_1'' = E_5(A) \times E_{10}(2A + A \times E_5(A)) \quad (22)$$

The blocking probability of two-hop traffic with S-Hops is:

$$P_2'' = (E_{10}(2A) \times (1 - E_5(A)) + E_{10}(2A + A \times E_5(A)) \times E_5(A)) \times 2 - \\ (E_{10}(2A) \times (1 - E_5(A)) + E_{10}(2A + A \times E_5(A)) \times E_5(A))^2 \quad (23)$$

Figure 11A:
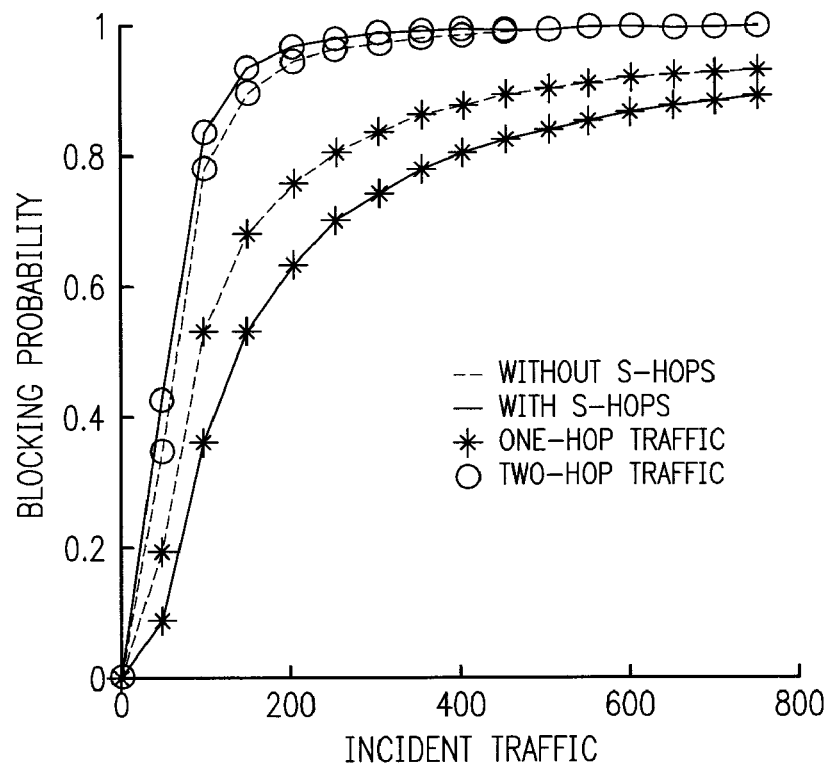
FIGS. 11A and 11B are graphs of the blocking probability versus the incident traffic on the network of FIG. 9, with and without the S-Hops method of the present invention
Figure 11B:
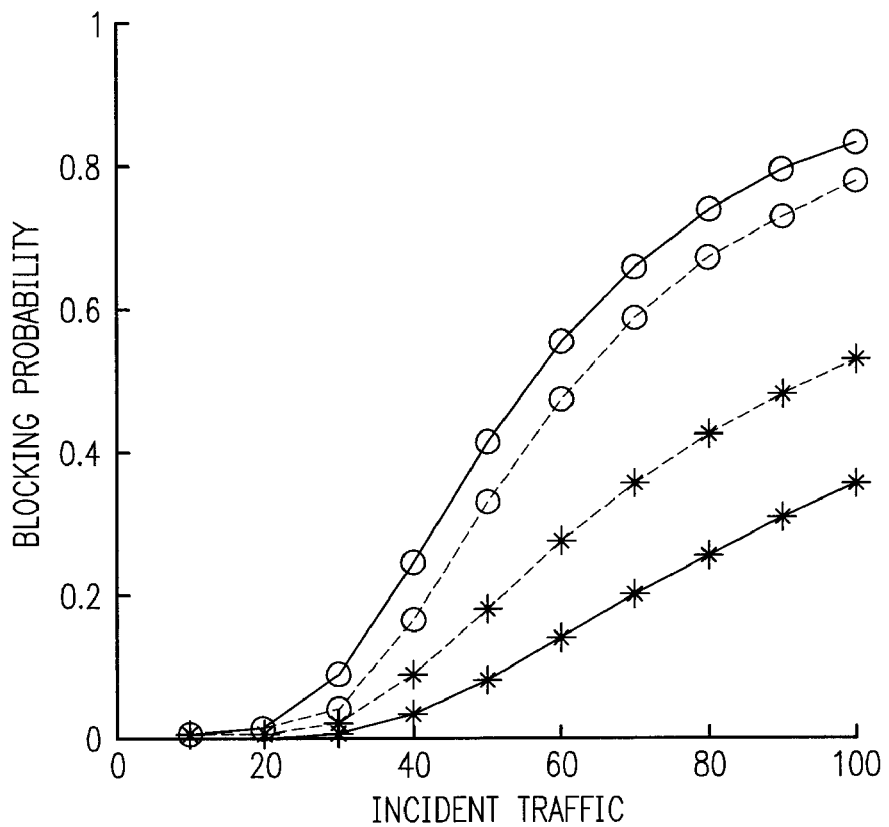

FIGS. 11A and 11B plot the blocking probability as a function of incident traffic with or without the use of the S-Hops method for Example 4.2. We again see that the S-Hops method realizes a higher blocking probability for the two-hop traffic relative to the single-hop traffic.

4.2.2 Network Traffic Carrying Capacity

Using arguments similar to that in Section 4.1.2 we can derive appropriate relationships for the traffic carrying capacity of the 5-node ring shown in FIG. 9. Details of the derivation are omitted for the sake of brevity. The actual results are plotted in FIG. 12. We can readily see that the S-Hops method allows the network to carry the most traffic.

Figure 12:
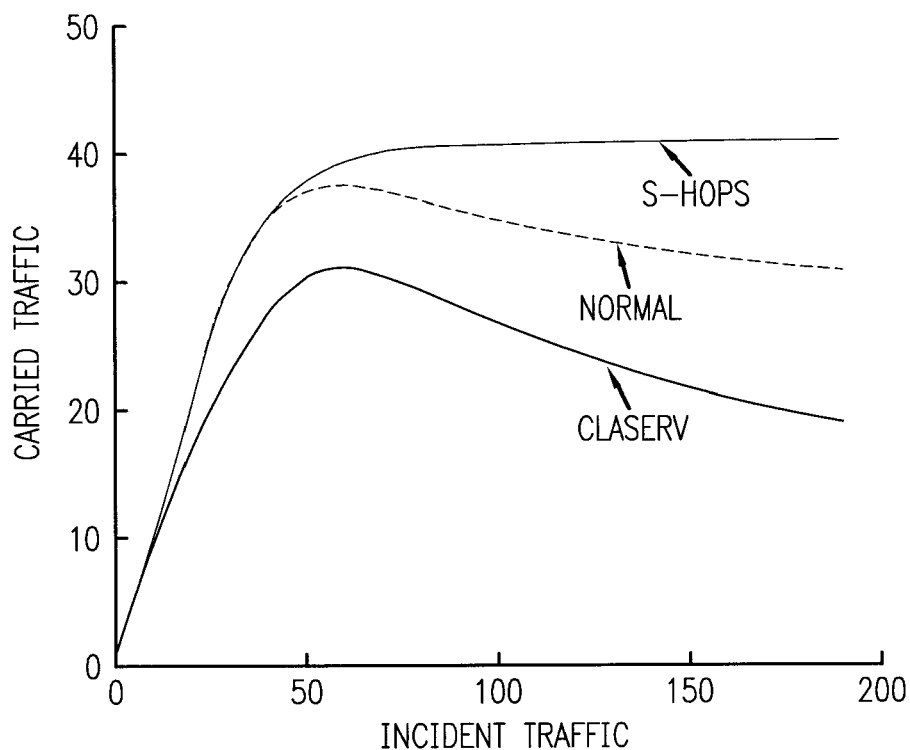
FIG. 12 is a graph of the carried traffic versus the incident traffic of the network of FIG. 9, for each of the normal, ClaServ, and S-Hops methods.

FIGS. 8 and 12 together show that use of the S-Hops method allows the network to carry the most traffic.

4.2.3 Network Revenue

We can also plot the network revenue of the 5-node ring using assumptions similar to that used in the Linear Bus example. This is shown in Figure B-10.

Figure 13:
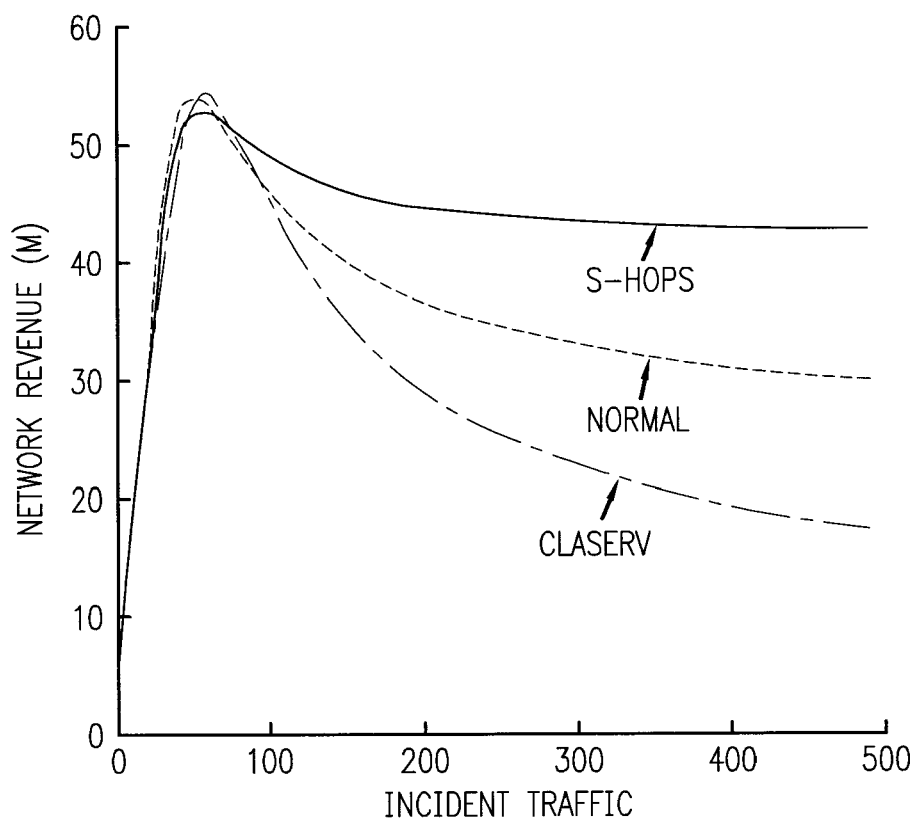
FIG. 13 is a graph of the network revenue versus incident traffic of the network of FIG. 9, for each of the normal, ClaServ, and S-Hops methods.

From FIG. 8 and FIG. 13, we can see that with the S-Hops method, networks can achieve the most revenue when the traffic intensity is relatively high.

5. Conclusion

In this embodiment, we have focused on the traffic carrying capacity of a DWDM network using two example topologies, a linear bus and a ring topology. We have shown that a recently proposed ClaServ method [B-2], used to solve the fairness issues associated with single- and multi-hop traffic, actually reduces the overall traffic carrying capacity of the network.

Additionally, we have proposed a new algorithm, the Service and Hops (S-Hops) method, which is aimed at maximizing the traffic carried by the network. By giving preferential treatment to traffic with less number of hops, the S-Hops method can actually increase the carrying capacity of the network by a significant amount, especially under high traffic conditions. We also note that the proposed S-Hops method actually increases the capacity of the network compared to the same when neither wavebanding nor classification of traffic is performed. Since the revenue of the service provider depends on the traffic actually served by the network, we also derive similar results for maximizing the network revenue.

C. Third Embodiment

1. Introduction

Dense Wavelength Division Multiplexing (DWDM) techniques are increasingly used to address exploding demands for bandwidth required by emerging applications of the Internet. Management of wavelengths is an important issue in DWDM networks. Each of the wavelengths in a DWDM network functions as a trunk in legacy circuit-switched networks. Several algorithms under a class of algorithms called routing and wavelength assignment (RWA) address the issue of wavelength management [C-1]-[C-4]. RWA is the way to select a suitable path and wavelength among the many possible choices for each connection request so that no wavelength is used more than once on the same link. The overall RWA problem can be separated into routing and wavelength assignment. Each of these can be classified as being static or dynamic.

In many ways, DWDM networks function as legacy circuit-switched networks. Consistent with this view, we define the Quality of Service (QoS) as the probability that an arriving connection request will be rejected, or blocked, because there are no available wavelengths to accomplish the request. Viewed in the context of the overall network, we can define network blocking as the average of blocking probabilities of all possible connection requests weighted by the incident traffic intensities. The network blocking then reflects the performance of the whole network, while each connection request on a link measures the blocking probability of that link. Viewed from a customer's perspective, a uniform level of blocking probability between any source-destination pair, independent of the number of hops, is desirable. However recent studies [C-1, C-2, C-5] have reported that traffic requiring a larger number of hops between the source and the destination suffers a higher blocking probability. This causes 'unfairness' among the different classes of service defined as the number of hops between the source and the destination. One way to address fairness is the technique of protection threshold [C-5], where the single-hop traffic is assigned an idle wavelength only if the number of idle wavelengths on the link is at or above a given threshold. Since the blocking probability grows fast as the number of hops increases, in order to obtain the same quality of service on the multi-hop traffic as the single-hop traffic, the multi-hop traffic route has to be "protected" or offered a higher level of priority.

The carried traffic (or the throughput) of a network is an important parameter that measures the performance of the network in the context of its overall utilization by measuring the actually delivered traffic. Under typical situations, the carried traffic increases as the traffic incident on the network increases. However under a congested scenario, the carried traffic of the network would remain constant or could actually decrease with increasing offered traffic [C-6]. Such a situation calls for congestion control to be initiated. Effective congestion control should be able to prevent the carried traffic of the network from dropping in the face of increasing incident traffic.

In order to solve the fairness and congestion problem, in this embodiment of the invention we propose a new algorithm, called Wavelength Reservation with Downward overflow and Congestion Control (WRDCC). This algorithm is implemented in two stages. Under normal traffic conditions, we use the Wavelength Reservation with Downward Overflow (WRD) method to solve the fairness problem. On the other hand, when the network faces heavy traffic which leads to congestion, we use the WRDCC method to maximize the network revenue.

The description of this embodiment is organized as follows. Section 2 proposes the new wavelength reservation with downward overflow method. The complete wavelength reservation with downward overflow and congestion control algorithm is presented in Section 3 and illustrated with examples. Section 4 presents our conclusion.

2. Wavelength Reservation with Downward Overflow (WRD)

2.1 WRD Algorithm and Analysis

Figure 14:
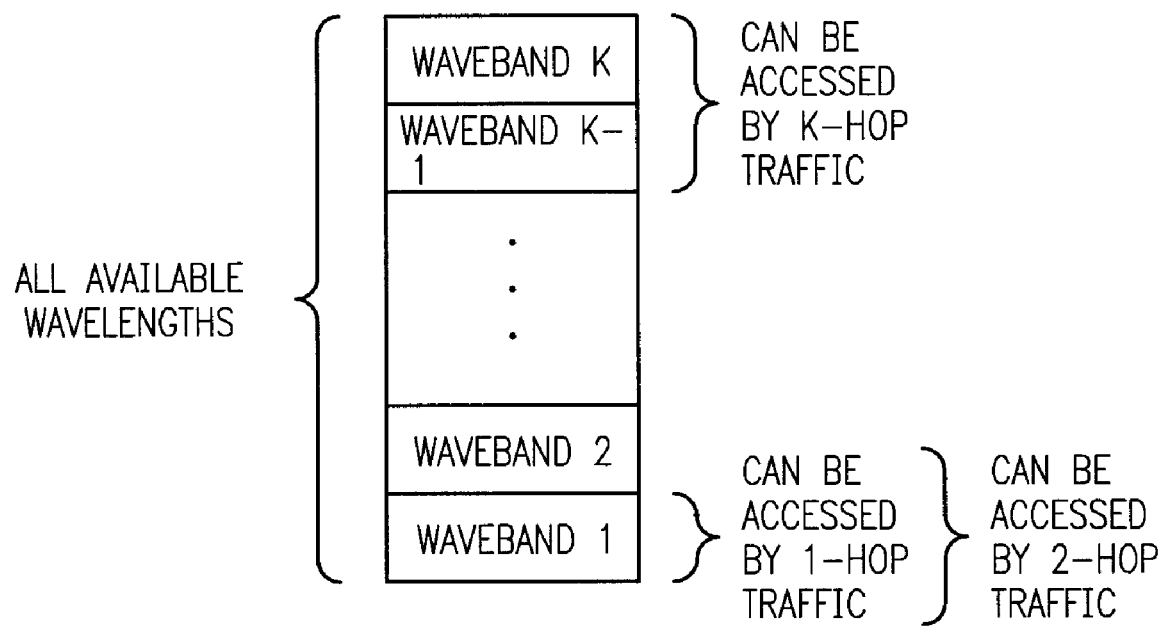
FIG. 14 is a pictorial diagram of a method of wavelength reservation with downward overflow (WRD).

As discussed before, we classify all traffic connection requests into different classes according to the number of hops from the source node to the destination node. We address the fairness problem by attempting to equalize the blocking probability of different traffic classes. In order to do this, we divide all available wavelengths on every physical link into a number of groups, or wavebands, equal to the number of traffic classes that will traverse that link. We make the following assignments of wavebands to the different classes: Traffic of class k can occupy the waveband k, or overflow to waveband k−1, if all the wavelengths in waveband k are busy carrying traffic. The assignment is shown graphically in FIG. 14.

With the WRD method, we give preference to traffic with more number of hops, but this preference is limited, because it can only access its own waveband and the next lower waveband. By doing so, we lower the blocking probability of traffic with larger number of hops while not unduly increasing the blocking probability of traffic with less number of hops. The number of wavelengths in each waveband in this algorithm is an important parameter that will determine the overall performance. We also make the following assumptions in our analysis.

A light-path is dynamically established and torn down in response to a random pattern of arriving connection requests and holding times.

The connection requests are Poisson distributed.

The holding time is exponentially distributed.

Blocked traffic is lost.

There is no blocking in the switching nodes.

A wavelength is chosen at random among all available wavelengths for a particular class of service.

Fixed routing is assumed.

Based on these assumptions, we can calculate the blocking probability for each class of traffic as follows.

If k is the largest number of hops in a network, the blocking probability of link l between two adjacent nodes in waveband k is:

$$P_{l_k} = E_{w_k}(A_k) \quad (1)$$

Where $$E_n(A) = \frac{\frac{A^n}{n!}}{\sum_{k=1}^{n} \frac{A^k}{k!}},$$

is the Erlang-B formula, $w_k$ is the number of wavelengths in waveband k, $A_k$ is the incident traffic intensity on the single-hop link of waveband k.

For any other waveband m, the blocking probability between two adjacent nodes is:

$$P_{l_m} = E_{w_m}(A_m) \times (1 - P_{l_{m+1}}) + E_{w_m}(A_m + A_{m+1} \times P_{l_{m+1}}) \times P_{l_{m+1}} \quad m = 1, \quad (2)$$
$$2 \ldots k-1$$

where $A_m$ is the incident traffic intensity of traffic class m.

The two terms in equation (2) address the two distinct probabilities when there is no overflow from a higher class (class m+1) of traffic and when there is.

The blocking probability of one-hop traffic is the same as the blocking probability of the link in waveband 1:

$$P_1 = P_{l_1} \quad (3)$$

For other class of traffic, the blocking probability on an end to end basis is given by:

$$P_n = 1 - (1 - P_{l_{n-1}} P_{l_n})^n \quad n = 2, 3 \ldots k \quad (4)$$

The next section presents an example using the above analytical results.

2.2 An Example

We use a 9-node ring as an illustration with the following additional assumptions.

The same set of wavelengths is in use on all physical links, and the number of wavelengths is 40.

The traffic is uniformly distributed among all node pairs.

Traffic connection requests are uniformly distributed among all node pairs, and denoted by A Erlangs.

We divide the 40 wavelengths into 4 wavebands as follows. Waveband 1 is for single-hop traffic and has 4 wavelengths; waveband 2 is for two-hop traffic and has 8 wavelengths; waveband 3 is for three-hop traffic and has 12 wavelengths; and waveband 4 is for four-hop traffic and has 16 wavelengths.

Figure 15A:
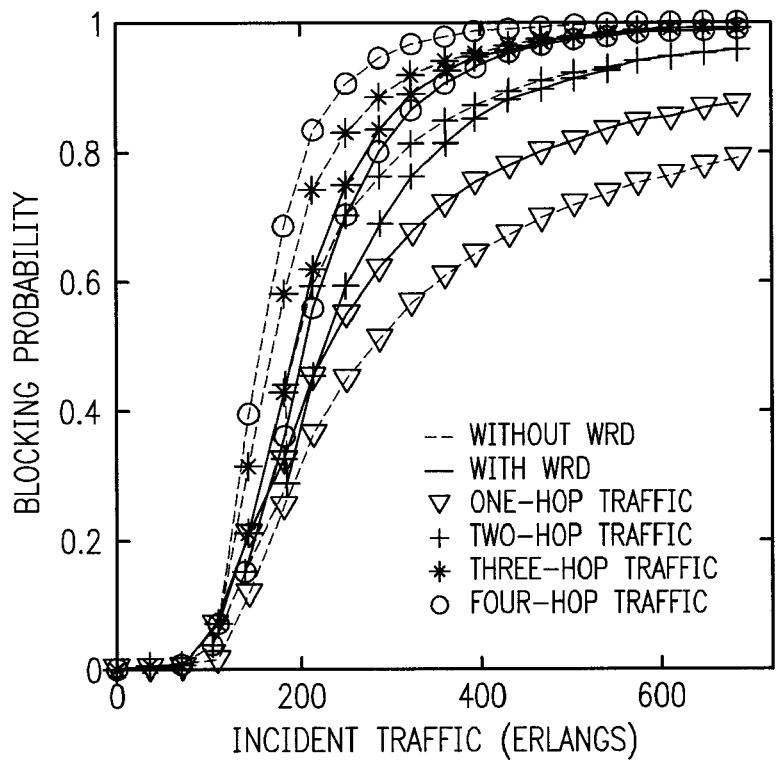
FIGS. 15A and 15B are graphs of blocking probability versus incident traffic for various traffic classes with and without the WRD method.
Figure 15B:
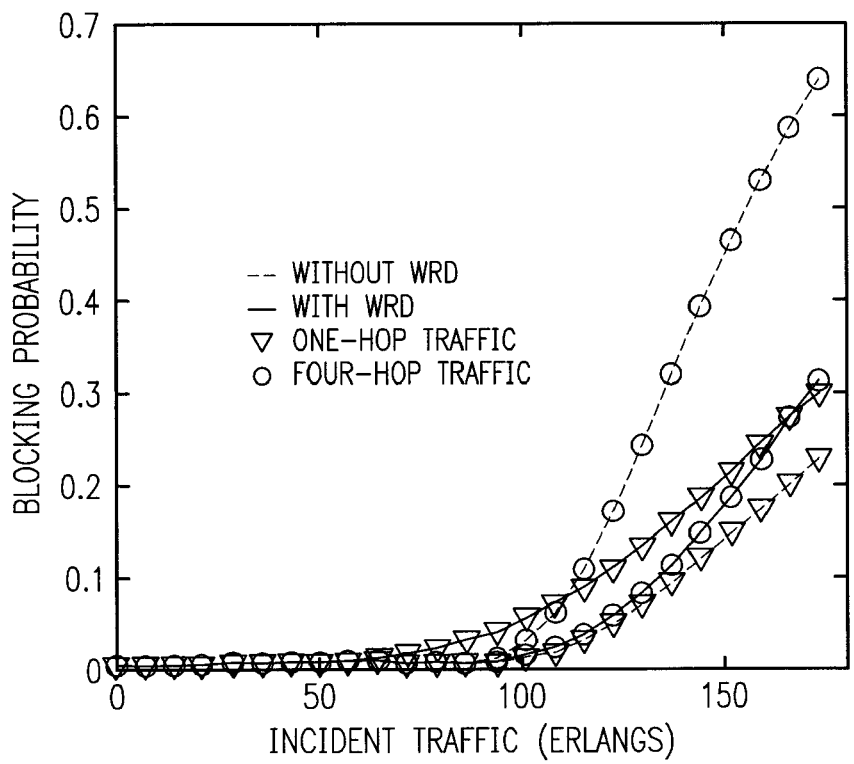

FIGS. 15A and 15B show the blocking probabilities of different traffic class of the network compared with a network without using the WRD method. In order to get a clear view, we plot FIG. 15B for a smaller traffic range and with only one-hop and four-hop traffic.

From FIGS. 15A and 15B we can see that under light load conditions, the blocking probability of multi-hop traffic is lowered at the expense of an increased blocking probability of single-hop traffic. We can further adjust the number of wavelengths in each waveband to achieve an ideal blocking probability for each traffic class.

Figure 16:
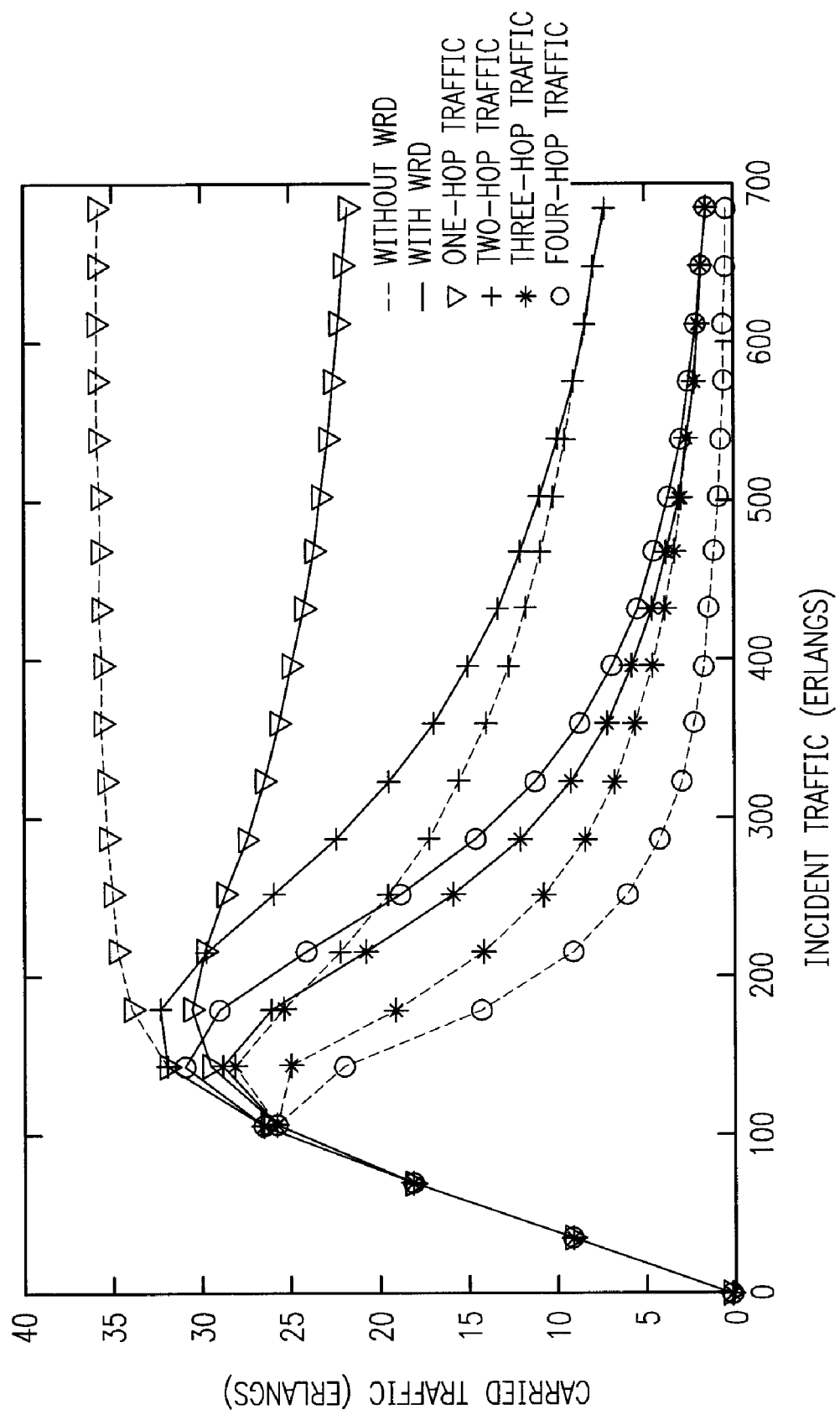
FIG. 16 is a graph of carried traffic versus incident traffic for various traffic classes with and without the WRD method.

FIG. 16 shows the carried traffic for different traffic classes with or without the WRD method. Under light traffic load, the carried traffic of different classes is almost the same but we have introduced more fairness among the different classes of traffic. We can see that in both cases, under congested conditions, the carried multi-hop traffic decreases as the incident traffic increases. And with the WRD method, even the carried-single-hop traffic decreases when the network is congested. This is because with the WRD method, the reserved waveband for single-hop traffic is also accessed by two-hop traffic under congestion.

From the service provider's point of view, another important measure of performance is the network revenue. We assume that for completed connections, the service revenue is $M/(Erlang*Hop). The network revenue of the network with or without using the WRD method is shown in FIG. 17 under various incident traffic conditions.

Figure 17:
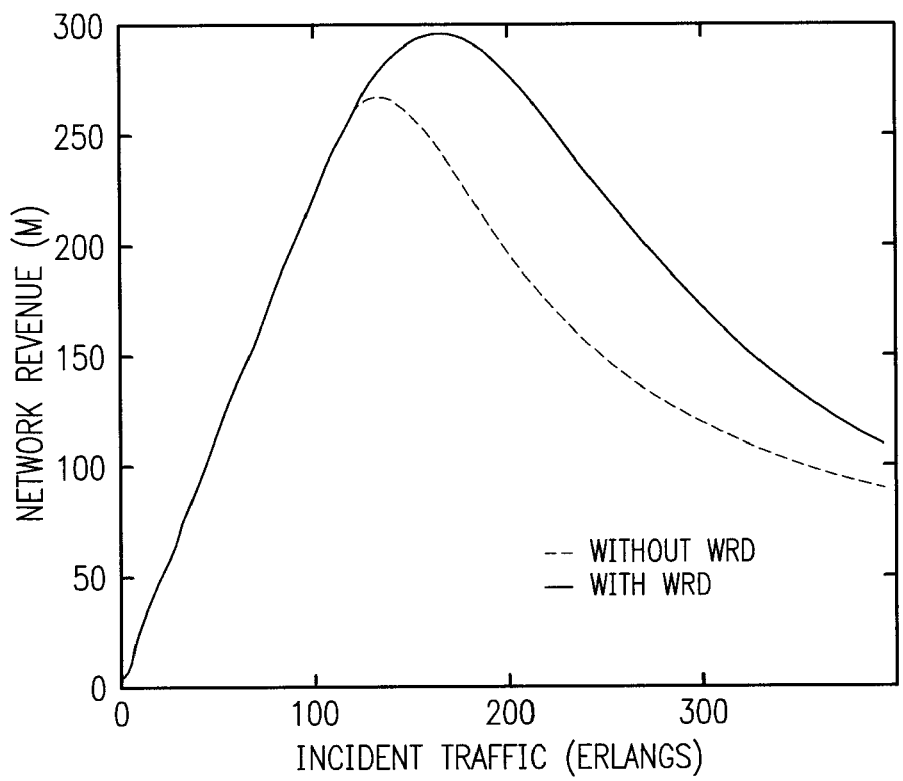
FIG. 17 is a graph of network revenue versus incident traffic with and without the WRD method.

From FIGS. 15-17, we can see that with the proposed WRD method, we solve the fairness problem without impacting the revenue of the network under normal incident traffic. However, if the network is very congested, the revenue decreases more rapidly with the WRD method as the incident traffic increases. It is actually worse under very traffic conditions (beyond the range shown in FIG. 17) with the WRD method.

3. Wavelength Reservation with Downward overflow and Congestion Control (WRDCC)

In a congested network, the multi-hop traffic not only suffers a high blocking probability, but the carried multi-hop traffic actually decreases as the incident traffic increases [C-6]. This is because for an incomplete multi-hop traffic, the network resources are poorly utilized. However, simply blocking all multi-hop traffic connection requests under congested conditions is not acceptable because of the fairness consideration.

The probability of completing multi-hop calls can be maximized by ensuring that all the links that together contribute the path between the source and the destination are available at the same time. To realize this, we choose the simple fixed routing and wavelength assignment method. We predefine the route and the available wavelengths for all possible source-destination node pairs. This can guarantee that no traffic will use any wavelength resource without providing the throughput for the customer and therefore revenue for the service provider.

Another important problem is when to initiate the congestion control. With fixed routing and wavelength assignment, the network resource utilization is relatively low under lightly loaded conditions. Therefore, if the traffic load is not heavy enough, the initiation of congestion control will actually decrease the carried traffic and the revenue of the network. If the initiation is too late, some network resources would be poorly utilized resulting in decreased throughput and revenue.

If the incident traffic of a network is denoted by A, using the WRD method, the revenue RWRD is a function of A, and can be represented as:

$$R_{WRD}(A) = f_{WRD}(A) \quad (5)$$

With fixed routing and wavelength assignments method, the revenue is represented as:

$$R_{FIX}(A) = f_{FIX}(A) \quad (6)$$

There is a point $A_s$, at which we have:

$$R_{WRD}(A) > R_{FIX}(A) \text{ if } A < A_s$$

$$R_{WRD}(A) \leq R_{FIX}(A) \text{ if } A > A_s \quad (7)$$

$A_s$ defines the point at which congestion control should be initiated.

The WRDCC algorithm starts with the WRD method, and after the incident traffic reaches $A_s$, it switches to fixed routing and wavelength assignment in order to initiate congestion control. With this algorithm, we can solve the fairness problem while maximizing the network revenue.

We demonstrate the effectiveness of the WRDCC method by considering the ring example of Section 2. Since we assume uniformly distributed traffic, we can assign all the available wavelengths in proportion to the number of hops of each traffic class. In this case, there are 4 wavelengths, or trunks, for each source-destination node pair, because there are 10 node pairs. So the blocking probability of between all node pairs is:

$$P = E_4(A) \quad (8)$$

Figure 18:
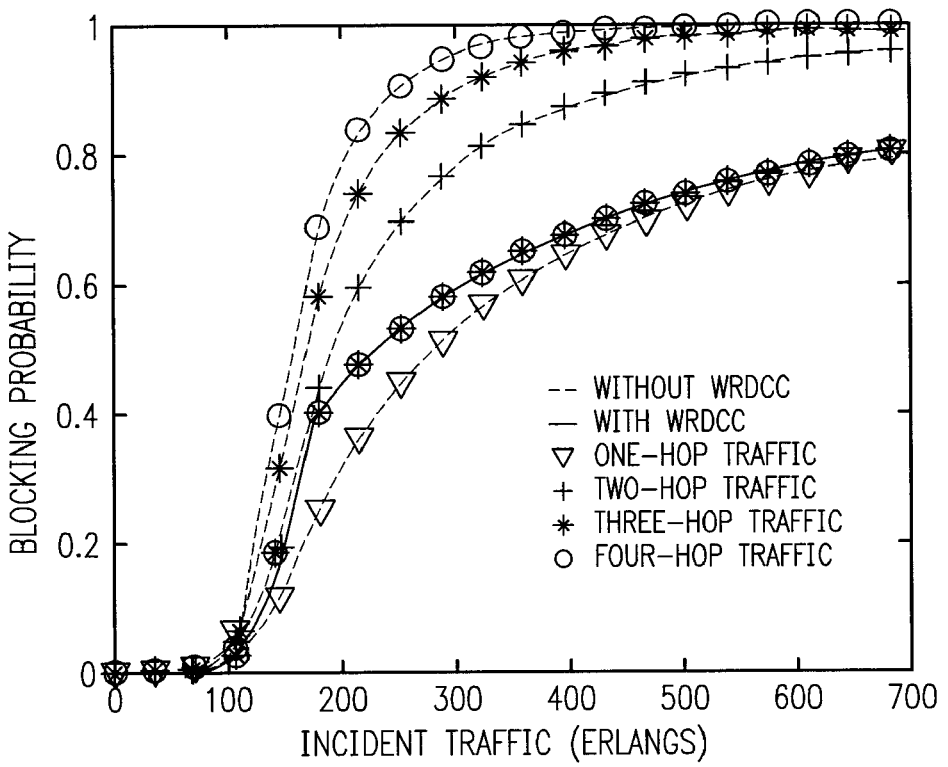
FIG. 18 is a graph of blocking probability versus incident traffic for various traffic classes with and without a WRDCC method of the present invention.

FIG. 18 shows the blocking probabilities of different traffic classes with or without using the WRDCC method. We note that the blocking probabilities have substantially improved for all traffic classes (except the single-hop traffic), while achieving fairness among the different classes of traffic.

Figure 19:
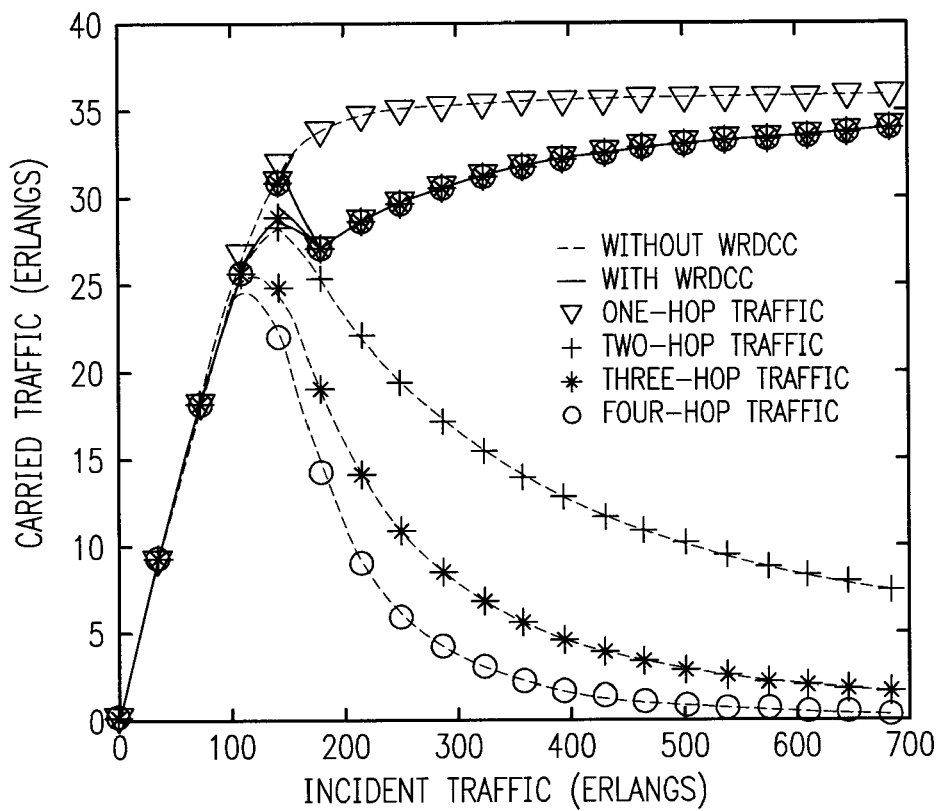
FIG. 19 is a graph of carried traffic versus incident traffic for various traffic classes with and without the WRDCC method.

FIG. 19 shows the carried traffic of the various traffic classes with or without using the WRDCC method. Using the proposed congestion control method, we have not only improved the throughput but also brought about fairness among the different traffic classes.

Figure 20:
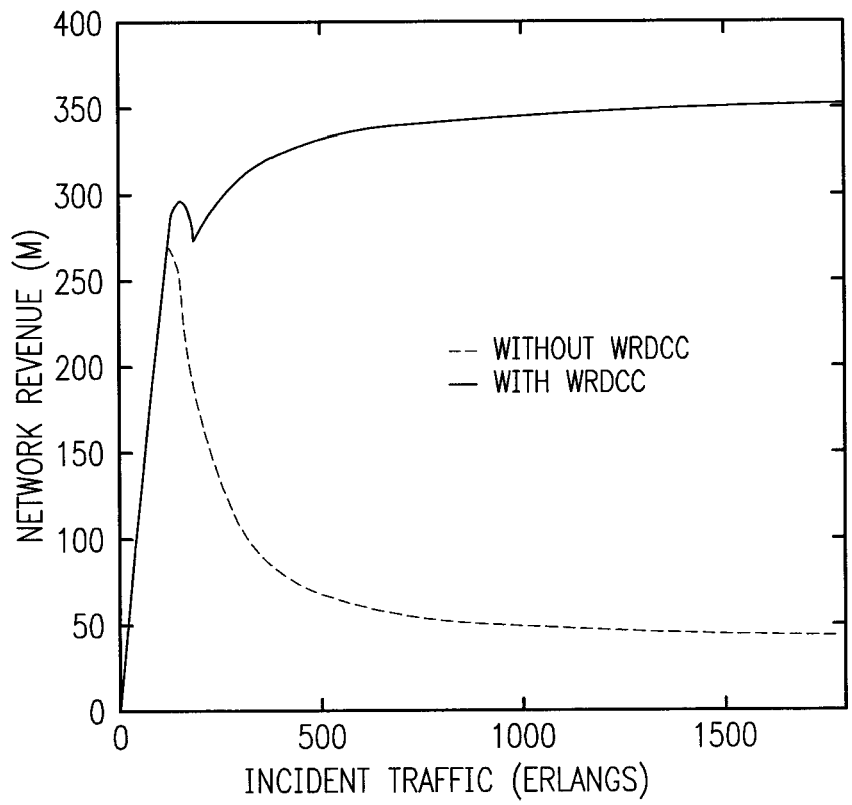
FIG. 20 is a graph of network revenue with and without the WRDCC method.

The network revenue with the WRDCC method is shown in FIG. 20 and compared with the one without using the WRDCC method. From it we can easily see that with the proposed WRDCC method, the network revenue can be increased substantially under congestion.

4. Conclusion

This embodiment of the invention has presented an algorithm to bring about fairness among different traffic classes in DWDM networks. The algorithm is executed in two steps. The WRD algorithm, implemented under light to moderately loaded traffic conditions, brings about fairness with only a small decrease in throughput. At a certain level of traffic, the algorithm initiates a congestion control process that prevents the throughput from decreasing any further, while maximizing the revenue of the network.

D. Fourth Embodiment

Limits on the Traffic Carrying Capacity of All Optical Networks with Ring Topology

I. Introduction

Dense Wavelength Division Multiplexing (DWDM) technique is the technology of choice for providing increasing demands of bandwidth. This demand is expected to rise unabated as emerging multi-media applications, which require ever increasing amounts of band-width, continue to grow rapidly. Using the DWDM technology, a single fiber can transmit data in the order of terabits per second. DWDM networks are based on the concept of wavelength routing. A light-path is an optical path established between two nodes that creates a bandwidth equivalent to a single or multiple wavelengths between them. If there is no wavelength converter in the network, the wavelength(s) used between the two nodes must obey the wavelength continuity constraint, which means that the same wavelengths must be available along the entire light-path. If there are wavelength converters available, a light-path can consist of different wavelengths. This makes the DWDM network behave like a circuit-switched network. There are two steps involved in establishing a light-path in DWDM networks: routing and wavelength assignment (RWA). Routing finds a route from the source node to the destination node. Wavelength assignment assigns a single wavelength or a set of wavelengths to the route. A connection request is said to be blocked if there is no free wavelength on the available paths between the corresponding node-pair.

A significant amount of research effort has been devoted to the RWA problem [D-1]-[D-3]. The objective is to maximize the number of connections that are established in the network at any time within the constraint of a fixed number of available wavelengths. In other words, the RWA objective is to let the network carry as much traffic as possible. The total amount of traffic carried by the network is an especially important parameter from the perspective of the network provider. This is because the network provider can only bill its client for the traffic that is actually carried by the network.

In a recent paper [D-9], Applicants have developed limits on the traffic carrying capacity of optical networks with an arbitrary topology. We build on the results obtained earlier, for the specific case of a ring topology and obtain several interesting results.

The description of this embodiment of the invention is organized as follows. Section 2 introduces the network model, including the assumptions made. Section 3 computes the limits of single-hop and multi-hop traffic that the network could carry. We also evaluate the total traffic carrying capacity of the network in this section. Section 4 presents our conclusion.

II. The Network Model

As stated before, we consider a DWDM-based ring topology. The ring topology is a popular architecture because of its inherent capacity of self-protection. Also, the routing mechanism of the ring topology is relatively simple, and amenable to mathematical analysis. Recent studies [D-1, D-7] have reported that traffic requiring a larger number of hops between the source and the destination suffers a higher blocking probability. In this embodiment, we consider all classes of traffic—single-hop as well as multi-hop—with a major focus on the overall traffic carried (or served) by the network as whole.

We make the following assumptions:
- The incident traffic among all node-pairs increases proportionately.
- The connection requests are Poisson distributed.
- The connection time is exponentially distributed.
- There is no buffer in the system, i.e., blocked traffic is lost.
- Fixed shortest path routing is always used.
- There are wavelength converters in the network
- Probability of blocking of each link in a network is independent from each other [D-8].

We define the following notations:

| | |
|---|---|
| N | Number of nodes in the network |
| W | Number of available wavelengths |

-continued

| | |
|---|---|
| A | The total incident traffic intensity in Erlangs |
| $a_{sd}A$ | The traffic intensity from node s to node d, where $\sum_s \sum_d a_{sd} = 1$ |
| $l_{ij}A$ | The incident traffic on the link between two adjacent nodes i and j. |
| $P_1$ | Blocking probability of single-hop traffic |
| $q_1$ | Probability that single-hop traffic gets served |
| $P_h$ | Blocking probability of traffic with h hops; h = 2 or more |
| $q_h$ | Probability that traffic with h hops gets served |
| C | The total traffic carried by the network |
| $C_i$ | The carried traffic that has traversed i hops |

Under these conditions, the Erlang B formula can be used to compute the probability of blocking, $E_n(A)$. We have:

$$E_n(A) = \frac{\frac{A^n}{n!}}{\sum_{k=0}^{n} \frac{A^k}{k!}}, \qquad (1)$$

where n is the number of trunks.

III. Limits on the Traffic Carrying Capacity

We mentioned previously that the focus of this embodiment of the invention is on assessing the ability of the network as whole to carry traffic. It has been shown in [D-9] that for a network with an arbitrary topology, as the incident traffic intensity increases, the carried single-hop traffic between source-destination node pair increases until it reaches a finite limit, while the carried multi-hop traffic increases but eventually goes to zero after reaching a peak. In this embodiment, we focus on ring topology, and give some special results. A network with finite resources (the number of wavelengths) and a given configuration (the number of nodes) will, of course, have a finite limit to the amount of traffic it can carry. Under the Erlang B assumption, the traffic either at the point of entry into the network, or at a point where it is transiting through a node, that does not get an available wavelength to carry it, will be dropped from the network as lost traffic. We first explore the limits to the single-hop traffic (i.e., traffic bound for the adjacent node), that the network would carry.

We derive the carried single-hop traffic in a ring network as follows.

For simplicity, we only consider the situation when N is odd. The two other cases when N is divisible by 4, or N even, but not divisible by 4, can be similarly derived.

The incident traffic on the link between two adjacent node i and j is:

$$l_{ij}A = \qquad (2)$$
$$a_{ij}A + a_{(i-1)j}A + a_{i(j+1)}A + \ldots + a_{\left(i-\frac{N-1}{2}-1\right)j}A + \ldots + a_{i\left(j+\frac{N-1}{2}-1\right)}A$$

$$P_{ij} = E_{w_{ij}}(l_{ij}A) = \frac{\frac{(l_{ij}A)^{w_{ij}}}{w_{ij}!}}{\sum_{k=0}^{w_{ij}} \frac{(l_{ij}A)^k}{k!}} \qquad (3)$$

then we have the carried single-hop traffic between the adjacent node i and j is:

$$C_{ij} = a_{ij}A \times (1 - p_{ij}) = \frac{a_{ij}A + \ldots + \frac{a_{ij} l_{ij}^{w_{ij}-1} A^{w_{ij}}}{(w_{ij}-1)!}}{1 + \ldots + \frac{(l_{ij}A)^{w_{ij}}}{w_{ij}!}} \qquad (4)$$

It can be seen from (4) that $$\lim_{A \to \infty} C_{ij-1} = \frac{w_{ij} a_{ij}}{l_{ij}} \qquad (5)$$

From (5), we can see that as the incident traffic intensity increases, the carried single-hop traffic goes to a finite limit.

The proof of the case where N is even is similar to when N is odd.

We can further derive the carried single-hop traffic when the incident traffic is uniformly distributed.

We consider the number of nodes N to be odd first. Since the traffic is uniformly distributed among all node-pairs, we have, $$a_{sd}A = \frac{1}{N \times (N-1)} A \qquad (6)$$

When N is odd, the maximum number of links (or hops) that traffic between any two points on the ring will traverse is $(N-1)/2$. Since the incident traffic is uniformly distributed over the ring, the traffic intensity on each fiber link is:

$$A_{ij} = \sum_{i=1}^{\frac{N-1}{2}} A_i = A + 2A + \ldots + \frac{N-1}{2} A = \frac{N^2-1}{8} \times \frac{1}{N \times (N-1)} A \qquad (7)$$

From equation (5) we can get $$\lim_{A \to \infty} C_{ij-1} = \frac{W \times \frac{1}{N(N-1)}}{\frac{N^2-1}{9} \times \frac{1}{N(N-1)}} = \frac{8W}{N^2-1} \qquad (8)$$

$$\lim_{A \to \infty} C_1 = \lim_{A \to \infty} (N \times C_{ij-1}) = \frac{8WN}{N^2-1} \qquad (9)$$

Figure 21:
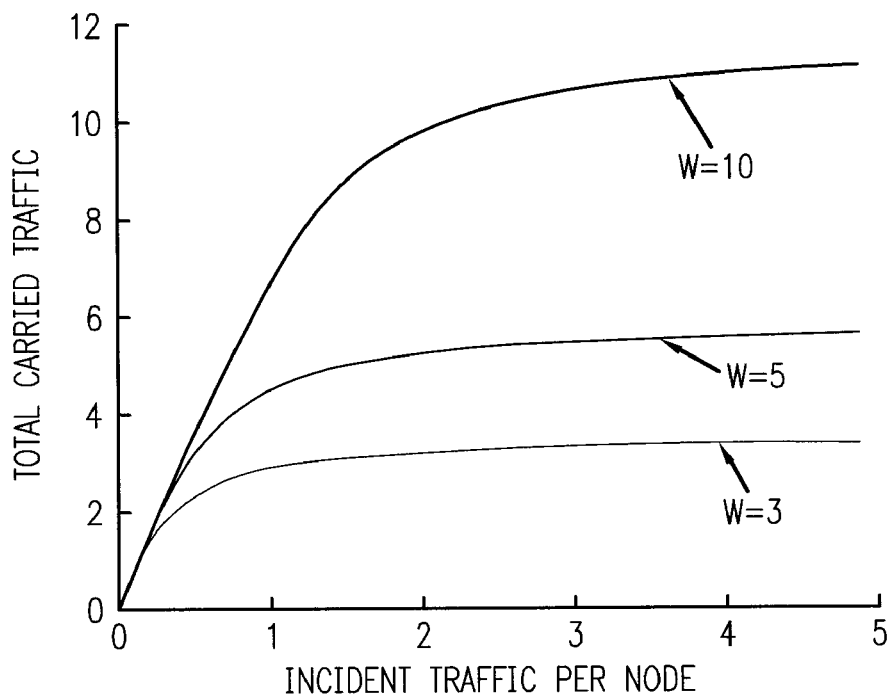
FIG. 21 is a graph of carried traffic versus incident traffic per node for various numbers of wavelengths.

FIG. 21 presents the single-hop carried traffic as a function of incident traffic for N=7. We use W, the number of wavelengths as a parameter.

The derivation of the case where N is even is similar to N is odd.

We can now summarize the results for all the three cases as:

$$\lim_{A \to \infty} C_1 = \frac{NW}{k}, \text{ where} \tag{10}$$

$$k = \begin{cases} \frac{N^2 - 1}{8} & N \text{ is odd} \\ \frac{N^2}{8} & N \text{ is divisible by 4} \\ \frac{N^2 + 4}{8} & N \text{ is even but not divisible by 4} \end{cases}$$

We now consider the multi-hop traffic. We note that multi-hop traffic is the traffic that uses two or more links (that is, find an available wavelength on these consecutive links), but the first lack of availability of a free wavelength on its journey to the destination will result in the multi-hop traffic being lost. Unlike the single-hop traffic, which will be served (or carried by the network) any time it consumes a band-width resource, the multi-hop traffic can consume resources of the network without increasing the throughput of the network.

Figure 22:
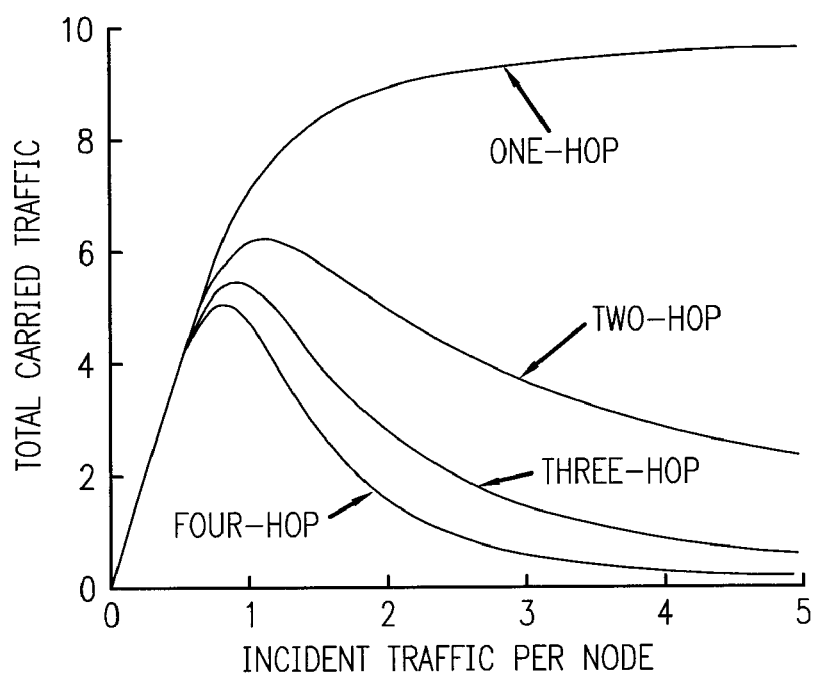
FIG. 22 is a graph of carried traffic versus incident traffic per node for various traffic classes.

For a ring network, as the incident traffic increases, the carried multi-hop traffic increases, but eventually goes to zero after a peak point. This can be derived as in [D-9]. As the traffic intensity increases, in the case of multi-hop traffic, more and more bandwidth resource of the network is wasted, eventually driving the throughput of the network to zero. FIG. 22 illustrates this phenomenon by a numerical example.

An interesting special case arises when the number of wavelengths is only one. This example is only of theoretical interest since DWDM implies that the number of wavelengths, W, is always greater than one. We consider this case in the following Lemma.

Lemma: When there is only one wavelength in the network, the total carried traffic goes to the same limit as the single-hop traffic.

Proof: For brevity, we only consider the case when N is odd and the traffic is uniformly distributed. The cases when N is even, or even and divisible by 4, can be similarly addressed.

Let $$k = \frac{N^2 - 1}{8},$$

and W=1. Then, we have, from equation (3), $$P_1 = E_1(kA) = \frac{kA}{1 + kA}, \text{ and}$$

$$q_1 = 1 - P_1 = \frac{1}{1 + kA}$$

The total carried traffic of the network:

$$C = C_1 + C_2 + \ldots + C_{\frac{N-1}{2}} \tag{11}$$

$$= NA(1 - P_1) + NA(1 - P_2) + NA(1 - P_3) + \ldots + NA\left(1 - P_{\frac{N-1}{2}}\right)$$

$$= NA(1 - P_1) + NA(1 - P_1)^2 + NA(1 - P_1)^3 + \ldots + NA(1 - P_1)^{\frac{N-1}{2}}$$

$$= NA \frac{q_1 \left(1 - q_1^{\frac{N-1}{2}}\right)}{P_1}$$

$$= \frac{N}{k}\left(1 - \left(\frac{1}{1 + kA}\right)^{\frac{N-1}{2}}\right) \text{ Further,}$$

$$\lim_{A \to \infty} C = \lim_{A \to \infty} \left(C_1 + C_2 + \ldots C_{\frac{N-1}{2}}\right) = \lim_{A \to \infty} C_1 = \frac{N}{k} = \frac{8N}{N^2 - 1} \tag{12}$$

Figure 23:
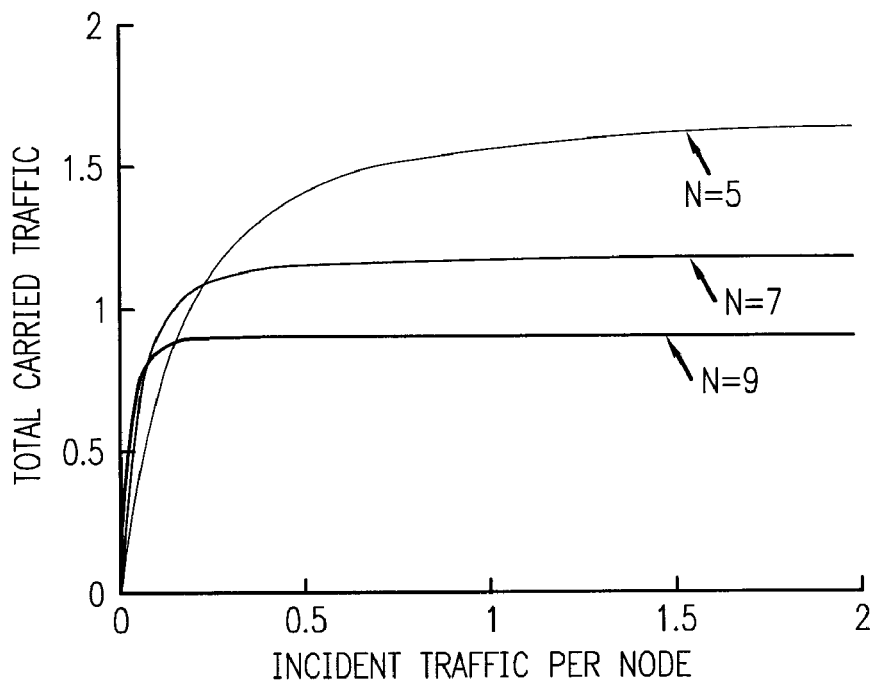
FIG. 23 is a graph of carried traffic versus incident traffic per node for various numbers of nodes.

From equation (12), we can see as A increases indefinitely, C tends to the same limit as that in equation (10), which computes the corresponding limit for single-hop traffic. FIG. 23 illustrates the carried single-hop traffic as a function of incident traffic intensity, using the number of node N as a parameter.

The results obtained in the preceding lemmas now can be generalized in a theorem that follows. In the theorem we focus on the total traffic capacity of a network, i.e., its throughput under the case of combined single- and multi-hop traffic with an arbitrary number of wavelengths, W.

Theorem: The capacity of a ring-based DWDM network as a function of symmetrically distributed incident traffic reaches a peak, but then declines to its single-hop traffic carrying capacity.

Proof: Combining the results from earlier, we can easily see that:

$$\lim_{A \to \infty} C = \lim_{A \to \infty} (C_1 + C_2 + \ldots) = \lim_{A \to \infty} C_1 = \begin{cases} \frac{8WN}{N^2 - 1} \\ \frac{8W}{N} \\ \frac{8WN}{N^2 + 4} \end{cases} \tag{13}$$

Figure 24:
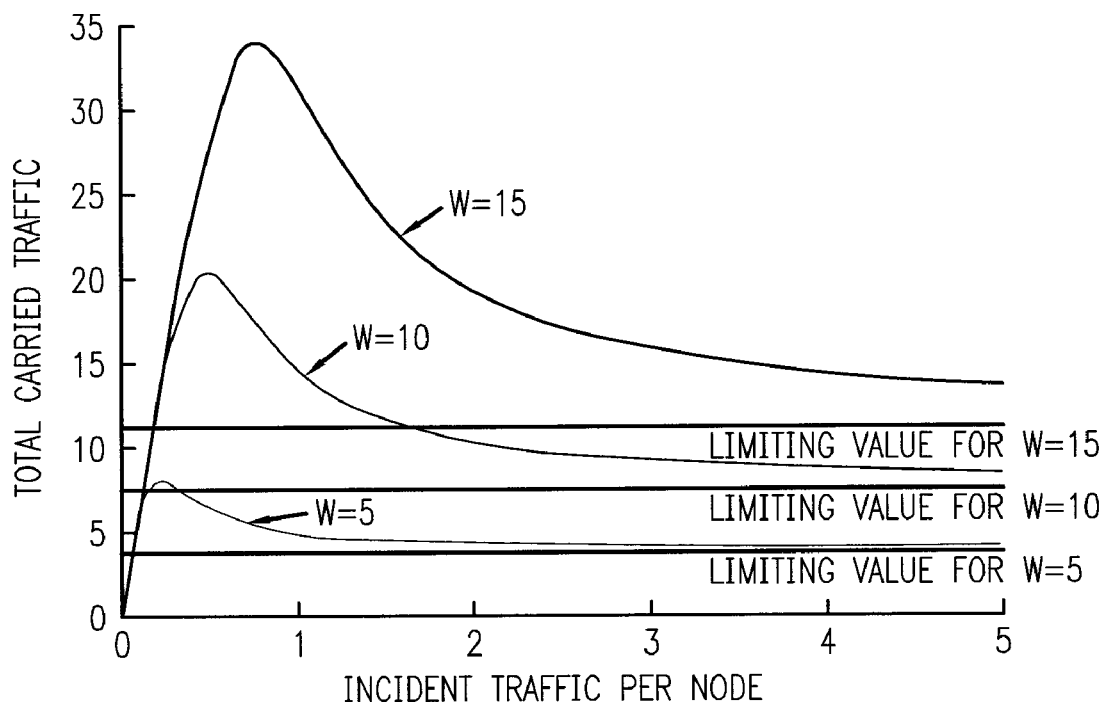
FIG. 24 is a graph of carried traffic versus incident traffic per node for various numbers of wavelengths
Figure 25:
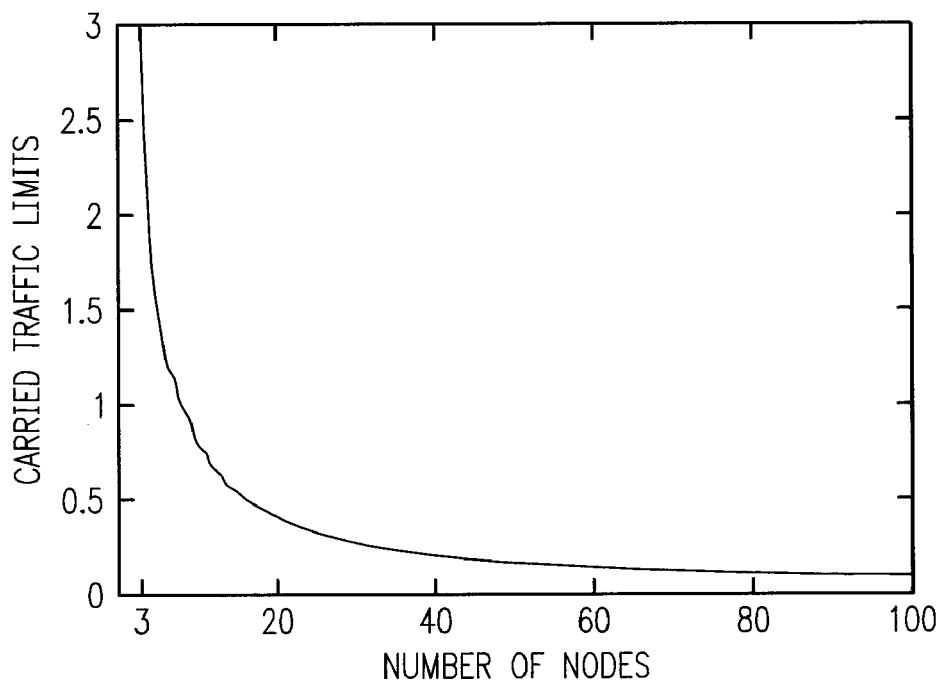
FIG. 25 is a graph of carried traffic limits versus number of nodes.

From equation (13), we can easily see that for a given number of nodes N, when the traffic intensity is indefinitely large, the carried traffic is proportional to the number of wavelengths. FIG. 24 presents an example for N=7 and use W as a parameter. We also see from equation (13) that for a given number of wavelengths, a network with a smaller number of nodes can carry more traffic than a network with a larger number of nodes. FIG. 25 shows the carried traffic limits as a function of the number of nodes on the network for the specific case of W=1. For higher values of W, the capacity is simply a multiple of the values shown in FIG. 25.

We now show that as the traffic intensity A increases, the total traffic reaches a peak before it asymptotically reaches the limits given in equation (13). For simplicity we only consider the case when N is odd. Results for the two other cases of N, i.e., divisible by 4 and even but not divisible by 4 can be similarly derived.

In order to show that the multi-hop carried traffic passes through a peak, we present an intuitive proof. First, we assume that the network has only two wavelengths, or W=2. Under the assumption, the carrying capacity of the network for single- and two-hop traffic only is given by, $$CC(2) = C_1 + C_2 = NAq_1 + NAq_1^2 = NAq_1(1 + q_1)$$

If the curves $$y = CC(2) \text{ and } y = \lim_{A\to\infty} C$$

intersect, then according to Rolle's theorem [D-5], it means that CC(2) has a peak point. Now we show that this point of intersection does exist.

Let $$CC(2) = \lim_{A\to\infty} C = \frac{8 \times 2 \times N}{N^2 - 1}$$

(condition for intersection)

Then, we have, $$Aq_1(1 + q_1) = \frac{8 \times 2}{N^2 - 1} \quad (14)$$

Since $$q_1 = \frac{1 + \frac{N^2-1}{8}A}{1 + \frac{N^2-1}{8}A + \frac{\left(\frac{N^2-1}{8}A\right)^2}{2!}},$$

from equation (7), if we let $$k = \frac{N^2 - 1}{8},$$

then equation (14) simplifies to $$\frac{A + kA^2}{1 + kA + \frac{(kA)^2}{2}} \times \frac{2 + 2kA + \frac{(kA)^2}{2}}{1 + kA + \frac{(kA)^2}{2}} = \frac{2}{k} \text{ or }$$

$$k^3 A^3 - 4kA - 4 = 0$$

According to Cardano's Equation [D-5], after we reject the other two complex solutions, we have $$A \approx \frac{2.3820}{k} \quad (15)$$

We do know that for a real network, the total carrying capacity C would be greater than or at least equal to the carrying capacity of the single- and two-hop traffic only. In other words, $C \geq CC(2)$. Therefore, C also has a peak point in $A(0, \infty)$ under the W=2 assumption that we made earlier. We now relax this condition and assume that W can assume an arbitrary value.

In order to show that the carried traffic C for any W has a peak point, we also have to show that the curves y=C and $$y = \lim_{A\to\infty} C$$

intersect. Now let's assume that when W=2, the intersection point is at A=2r. If there are w (w>2) available wavelengths in the network, then at the point A=wr, the blocking probability of single-hop traffic in the network is:

$$P_1' = E_w\left(\frac{N^2-1}{8}wr\right) \leq P_1 = E_2\left(\frac{N^2-1}{8}2r\right) \quad (16)$$

$$q_1' = 1 - P_1' \geq q_1 = 1 - P_1$$

$$C' = NA'\left(q_1' + q_1'^2 + \ldots + q_1'^{\frac{N-1}{2}}\right)$$

$$\geq Nwa\left(q_1 + q_1^2 + \ldots + q_1^{\frac{N-1}{2}}\right)$$

$$= \frac{8wN}{N^2 - 1},$$

which is the limit for w wavelengths.

Equation (16) shows that when W is greater than 2, at point A=wr, the carried traffic C has already crossed the limit $$y = \frac{8WN}{N^2 - 1},$$

so it too has a peak point.

Figure 26:
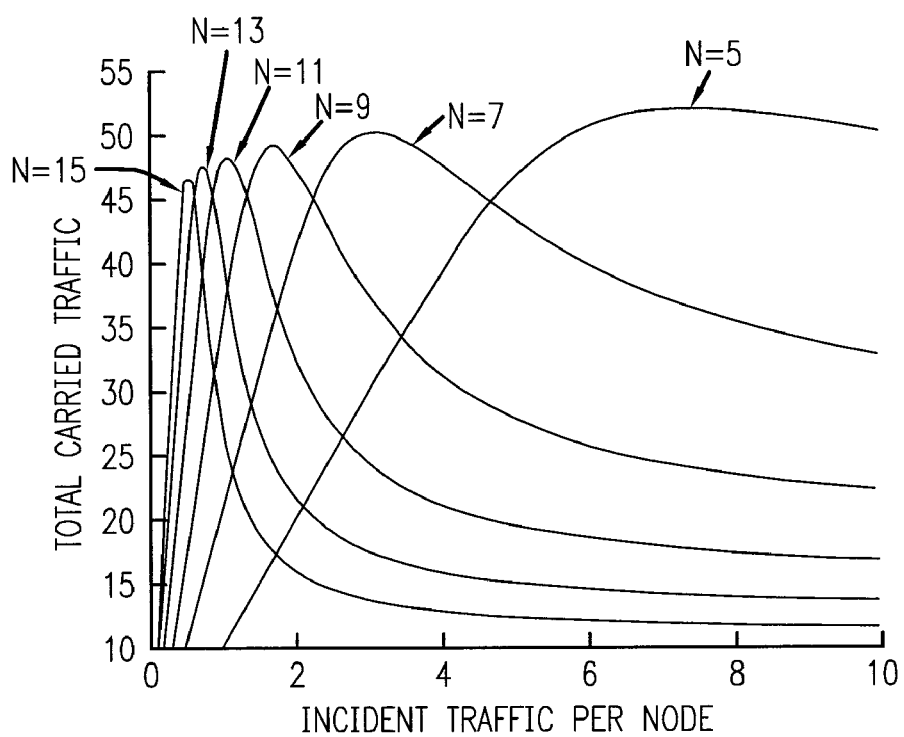
FIG. 26 is a graph of carried traffic versus incident traffic per node for various numbers of nodes.

We can now state that when there are multiple wavelengths available in the network, the total carried traffic has a peak point before it drops to the asymptotic limit of single-hop traffic. FIG. 26 is an illustration where W=20 and the number of nodes N, a parameter.

From FIG. 26, we can make the following observations:

For any N, the total carried traffic of the network has a peak point

The total carried traffic decreases asymptotically after the peak point.

The peaks become sharper as N increases.

When the traffic intensity is low, a network with larger number of nodes carries more traffic.

The traffic carrying capacity of a network with larger N is lower than a network with a smaller N.

A network with larger N reaches its peak point faster than a network with smaller N.

IV. Conclusion

The traffic carried (or served) by a DWDM ring network is the sum of traffic that transits through a single or multiple numbers of hops and reaches its destination. In this embodiment of the invention, we have presented a means to compute the traffic carrying capacity of ring network as a function of the incident traffic intensity with an arbitrary number of nodes and number of available wavelengths. We have shown that for a fixed number of nodes, the total traffic carried by the network increases as the number of wavelengths increases, showing a peak in each case, and then asymptotically decreasing to a level corresponding to the throughput level applicable to single-hop carried traffic. Also, the total carried traffic reduces when the number of nodes N increases for a given level of resources (wavelengths). Further, as N increases, the peaks are sharper.

E. Fifth Embodiment

Revenue Optimization in Optical Networks with Congestion Aware Wavelength Reservation

I. Introduction

Advancements in Dense Wavelength Division Multiplexing (DWDM) technology make it a prime candidate for meeting exploding demands for bandwidth. DWDM divides a large bandwidth into multiple wavelength channels. Use of wavelength converters makes optical networks function as legacy circuit-switched networks, but with some special characteristics. Wavelength management is an important issue in DWDM networks. A light-path is an optical path established between a source node and a destination node. To set up a light-path in DWDM networks, two steps are involved: Routing and Wavelength Assignment (RWA) [E-1]. A connection request is said to be blocked if there is no free wavelength available on any of the links on a path between the source and destination node-pair. The RWA problem has been studied extensively and reported in recent literature [E-1]-[E-5]. The objective of these studies is to develop algorithms that maximize the number of connections or light-paths in the network at any time within the constraint of a fixed number of available wavelengths on each physical link. An important point to note is that the algorithms and heuristics reported in the literature address normal operating conditions that do not apply when the network is in a state of congestion.

Consistent with the legacy circuit-switched networks, we define the quality of service (QoS) in DWDM networks as the probability that a connection request between a specified source-destination pair will be rejected because there is no optical path to complete the end to end connection. The network blocking probability, which we define as the sum of the blocking probabilities of all possible connection requests weighted by the relative incident traffic intensities, is an important parameter that measures the network performance. We propose that this figure characterize the traffic carrying capacity of the network as a whole. However, we note that the blocking probability of a connection request between specific source-destination pairs will, in general, be different from each other.

Recent studies [E-2, E-6] have shown that as traffic traverses more number of hops, it suffers a higher blocking probability than traffic with less number of hops. This causes 'unfairness' among the different classes of service defined as the number of hops between the source node and the destination node. In general, customers would desire a uniform level of blocking probability, or at least a QoS that specifies a maximum probability of blocking. Several methods to address the fairness problem have been proposed [E-3, E-6, E-9]. In this context, we define "fairness" as the blocking probabilities among different classes of traffic as being the same or at least similar. In [E-6], the technique of protection threshold is used, where the single-hop traffic is assigned an idle wavelength only if the number of idle wavelengths on the link is at or above a given threshold. In [E-3], the Traffic Classification and Service (ClaServ) method is introduced to optimize the fairness problem, where all the available wavelengths are divided into a number of wavebands, and preference is given to multi-hop traffic. Thus, the blocking probability of multi-hop traffic is lowered at the cost of an increase in the blocking probability of single-hop traffic, as well as a decrease in the traffic carrying capacity of the network. In [E-9], the WRDCC (Wavelength Reservation with Downward overflow and Congestion Control) method has been proposed to solve the fairness problem. As in [E-6], it also gives preference to multi-hop traffic, so the blocking probability of multi-hop traffic can be lowered. The advantage of the algorithm in [E-9] is that since the traffic with more number of hops can only downward overflow one waveband, it doesn't interfere the traffic with lesser number of hops as in [E-6], and this results in an improvement of the traffic carrying capacity of the network. However when the incident traffic is light, the throughput of the whole network is still lower than the network without wavebanding, and this is not desirable.

The throughput (or the carried traffic) of a network is an important parameter to measure the performance of the network. Under normal conditions, the carried traffic increases as the incident connection requests increase. However, if the network is congested (i.e., when the incident traffic increases beyond the capacity of the network), the carried traffic will remain constant or decrease as the incident traffic increases [E-7]. It has been mathematically shown in [E-8] that for a network of an arbitrary topology as the incident traffic increases, the carried multi-hop traffic reaches a peak and then drops to zero, while the carried single-hop traffic goes to an asymptotic limit. Since service providers collect their revenue based on the carried traffic, a decrease in carried traffic means reduced revenue.

This embodiment of the invention presents a new algorithm, named the Congestion Aware Wavelength Reservation (CAWR) that addresses the fairness problem while at the same time maximizing the throughput of the network. The proposed algorithm dynamically reserves a number of wavelengths for a class of traffic according to the congestion situation in the network. The objective of this algorithm is to optimize network revenue while providing fairness among different classes of services.

The description of this embodiment of the invention is organized as follows. Section 2 proposes the new Congestion-Aware Wavelength Reservation method and its analysis. Section 3 illustrates the algorithm with an example. Section 4 presents our conclusion.

II. Analysis of the Congestion Aware Wavelength Reservation Algorithm

Figure 27:
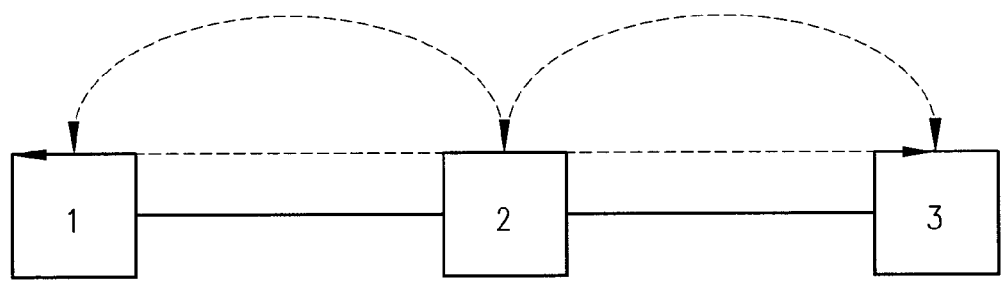
FIG. 27 is a block diagram of a linear bus with three nodes.

During light load conditions, sharing wavelengths among all traffic connection requests in an unrestricted manner will result in high throughput because no traffic is lost due to wavelengths being artificially restricted from carrying any other traffic and because the load is low enough so that all the incident traffic is carried. This can be seen from an example shown in FIG. 27. Assume there are two wavelengths available on each fiber connection. If we do not share wavelength, one is used for single-hop traffic, and the other one for two-hop traffic. When there are two connection requests from node 1 to node 2, then one of them has to be blocked although the wavelength used for two-hop traffic is idle. But if we share those two wavelengths, we can complete both of the connection requests.

On the other hand, when the incident traffic is high, sharing network resources leads to a waste of network resources. This is because, for multi-hop traffic, if any hop along its route from the source node to the destination node is blocked, the traffic is lost. It is entirely possible even likely that a multi-hop connection request is rejected after it has cleared several hops, under high traffic conditions. In other words, the multi-hop traffic does not produce the corresponding throughput, and actually results in wasting network resources by making them underutilized. Thus, under heavy load conditions, the solution we propose is to predefine a route and a set of wavelengths for every source-destination node pair. This would mean that once the multi-hop traffic identifies the first available wavelength on the first physical link, it's guaranteed to reach the destination. Thus, in general, under light load conditions, we share network resources among all traffic connection requests, while under heavy load conditions, we fix the route and assign wavelengths for every source-destination pair. This is the essence of the proposed Congestion Aware Wavelength Reservation (CAWR) method. The objective is to maximize the network revenue while providing fairness among different classes of traffic.

CAWR thus resolves the fairness and throughput issues both at the low and the high traffic situations. In between these two extremes, there would be situations that need to be addressed differently, i.e., where we take advantage of both wavelength sharing, and fixed routing and wavelength assignment. In order to accomplish this, we reserve wavelengths for a source-destination node-pair, as well as share wavelengths. For a particular connection request, the CAWR algorithm will first try to find a free wavelength among the reserved wavelengths for the node-pair; if all the reserved wavelengths are in use, it will search for an available wavelength from the shared wavelengths. If it cannot find a wavelength among the shared wavelengths, the connection request is rejected. For a certain traffic distribution, or incident traffic matrix, the following heuristic will find the number of reserved wavelengths for each source-destination node pair:

```
P = the number of wavelengths reserved between the source
    and the destination;
W = 1;
For (i=1; i++, i<=P)
{
    Modify the wavelength reservation;
    Establish connections;
      Calculate the corresponding generated revenue R(i);
    If R(i) > R(i-1)
        W=i;
}
```

Figure 28:
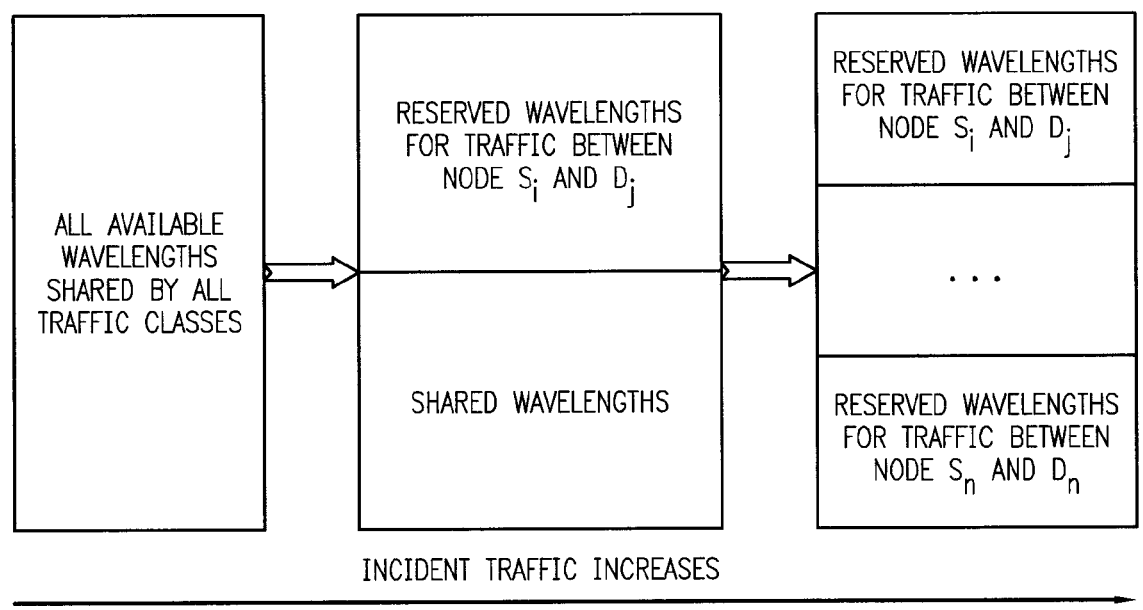
FIG. 28 is a pictorial illustration of a Congestion Aware Wavelength Reservation (CAWR) method of the present invention.

This algorithm simply calculates the network revenue with all possible wavelength reservations, and chooses the one which yields the most revenue. We assume that for completed call connections, the service revenue is $ M/(Erlang*Hop). The algorithm is shown in FIG. 28. We assume fixed routing in this paper.

We consider a general topology of a network with N nodes. We define the following notations:

| | |
|---|---|
| N | Number of nodes in the network |
| $w_{sd}$ | Number of wavelengths reserved for the connection requests between node s and d |
| $r_{mn}$ | The number of shared wavelengths between adjacent nodes m and n for all traffic connection requests |
| $a_{sd}$ | The incident traffic intensity in Erlangs between node s and node d |
| $W_{mn}$ | The total number of wavelengths on a link between two adjacent nodes. |

-continued $$W_{mn} = \sum_{i,j=1}^{N} w_{ij} + r_{mn},$$

where $w_{ij}$ is the number of reserved wavelengths for traffic going through link mn. We assume the same set of wavelengths is available on all the links in the network, $W_{mn}$ = W

| | |
|---|---|
| $p_{sd}$ | The blocking probability between node s and d. $p_{sd} = p_{sd_r}$ (the blocking probability in the reserved wavelength channels) $p_{sd_s}$ (the blocking probability in the shared wavelength channels) |
| $M_{sd}$ | The revenue collected from a completed connection between node s and d. We assume that for completed call connections, the service charge is $M/(Erlang * Hop) |
| R | Network revenue. We have |

$$R = \sum_{s,d=1}^{N} a_{sd}(1 - p_{sd})M_{sd}$$

The objective of this algorithm is to maximize network revenue R by adjusting the number of reserved wavelengths and shared wavelengths according to the incident traffic distribution.

$$\max(R) = \max\left(\sum_{s,d=1}^{N} a_{sd}(1 - p_{sd})M_{sd}\right)$$

$$= M_{sd} \times \max\left(\sum_{s,d=1}^{N} a_{sd}(1 - p_{sd})\right)$$

In reality, the incident traffic $a_{sd}$ is continuous, and changes from time to time. It is impossible for a service provider to adjust the number of reserved wavelengths continuously because of the computing complexity. However since DWDM networks are basically used for backbone connections, the traffic distribution is usually stable. So even if only a finite and manageable number of traffic distributions are chosen, and the corresponding wavelength assignment is calculated, a desirable result can be achieved. At any time, the traffic distribution of the network can be matched to the nearest predefined one.

III. Numerical Example

In this section, we consider a 9-node ring as an illustrative example with the following assumptions.

A light-path is dynamically established and torn down in response to a random pattern of arriving connection requests and holding times.

The connection requests are Poisson distributed.

The holding time is exponentially distributed.

Blocked traffic is lost.

There is no blocking in the switching nodes.

A wavelength is chosen at random among all available wavelengths for a particular class of service.

The same set of wavelengths is in use on all physical links, and the number of wavelengths is 40.

Traffic connection requests are uniformly distributed among all node pairs.

There are wavelength converters in the network.

Probability of each link in a network is independent from each other [E-10].

Since we assume uniformly distributed traffic here, the wavelength reservation for any source-destination node pair for a class of traffic is the same for every other source-destination node pair. (Note that a class of traffic refers to the number of hops that the traffic encounters between the source and the destination.) The number of wavelengths reserved for a class of traffic is denoted as $W_h$, where h is the number of hops that the traffic traverses. We have $$W = \sum_{h=0}^{k} W_h,$$

where k is the largest number of hops in the network from any source node to any destination, and $W_0$ is the number of shared wavelengths. For this example, we have k=4.

If the total incident traffic is A, then the connection requests from each node is:

$$A_i = A/9 = \sum_{j=1}^{N} a_{ij} = 8a$$

where $a_{ij}$ is the incident traffic between node i and j, and since all the node pairs have the same incident traffic, i.e., $a_{ij}$=a.

In this example, we calculate the optimized $W_h$ at a 0.5 interval, i.e., a=0.5, 1.0, 1.5, .... For each value of a, $W_h$ can be 0, 1, 2, 3 or 4, where $1 \leq h \leq 4$. The higher limit for h exists because, for a 9-node ring, the number of wavelength required to make a full interconnectivity is 10 [E-4]. With these limitations in mind, we use the heuristic to calculate all possible combinations of $W_h$, and choose the one that yields that best revenue. Table 1 shows the corresponding number of wavelength reservation for a class of traffic as the incident traffic varies.

TABLE 1

The Wavelength Reservation vs. Incident Traffic

| a(Erlangs) | $W_4$ | $W_3$ | $W_2$ | $W_1$ | $W_0$ |
|---|---|---|---|---|---|
| 0–0.99 | 0 | 0 | 0 | 0 | 40 |
| 1–1.99 | 2 | 2 | 2 | 2 | 20 |
| 2–4.49 | 3 | 2 | 2 | 2 | 16 |
| 4.5–12.49 | 4 | 4 | 3 | 2 | 4 |
| 12.5– | 4 | 4 | 4 | 4 | 0 |

Figure 29:
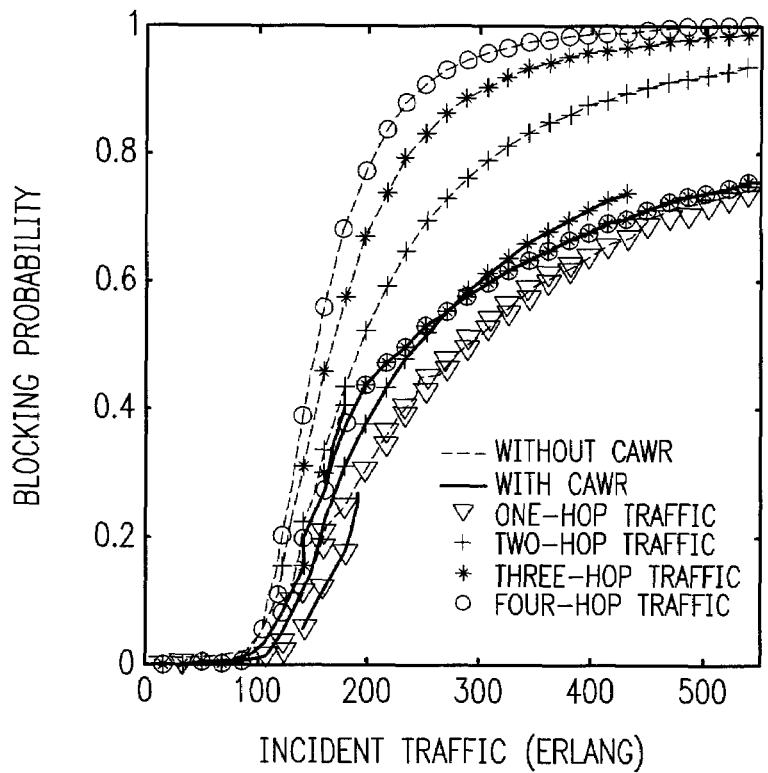
FIG. 29 is a graph of blocking probability versus incident traffic with and without the CAWR method.

FIG. 29 shows the blocking probability of different classes of traffic with or without using the CAWR method. We can see that the blocking probabilities of multi-hop traffic are lowered, and the difference among different traffic classes is also reduced, especially when the incident traffic is high. This solves the so-called fairness problem.

Figure 30:
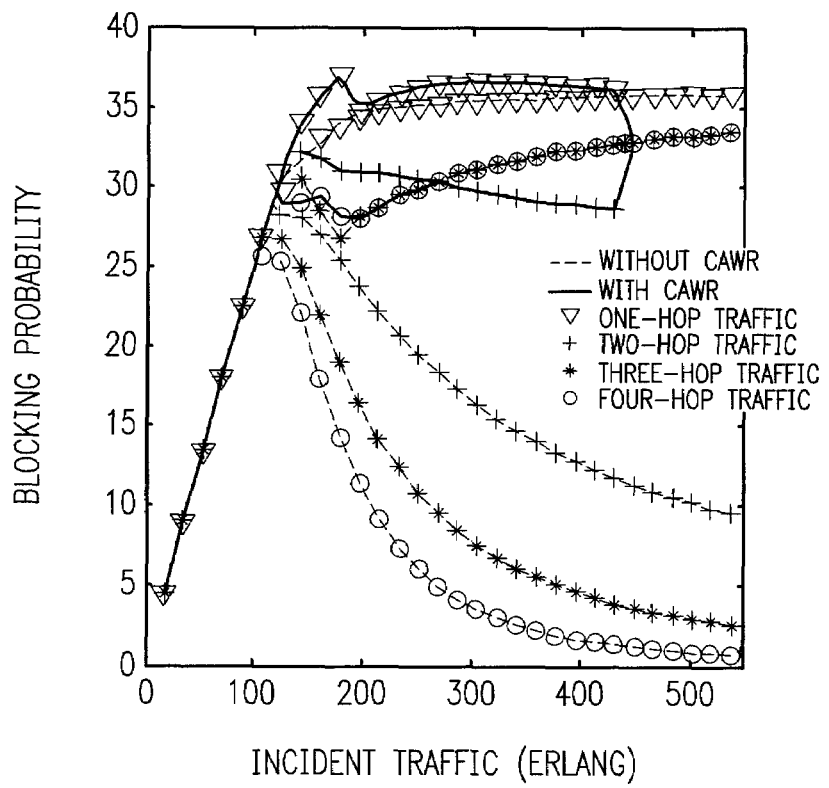
FIG. 30 is a graph of carried traffic versus incident traffic with and without the CAWR method.

FIG. 30 shows the carried traffic of different traffic classes with or without using the CAWR method as a function of incident traffic. We can see that using the CAWR method, the throughput of multi-hop traffic is increased. When the network is congested, multi-hop traffic can still be carried in the network instead of being almost entirely blocked.

Figure 31:
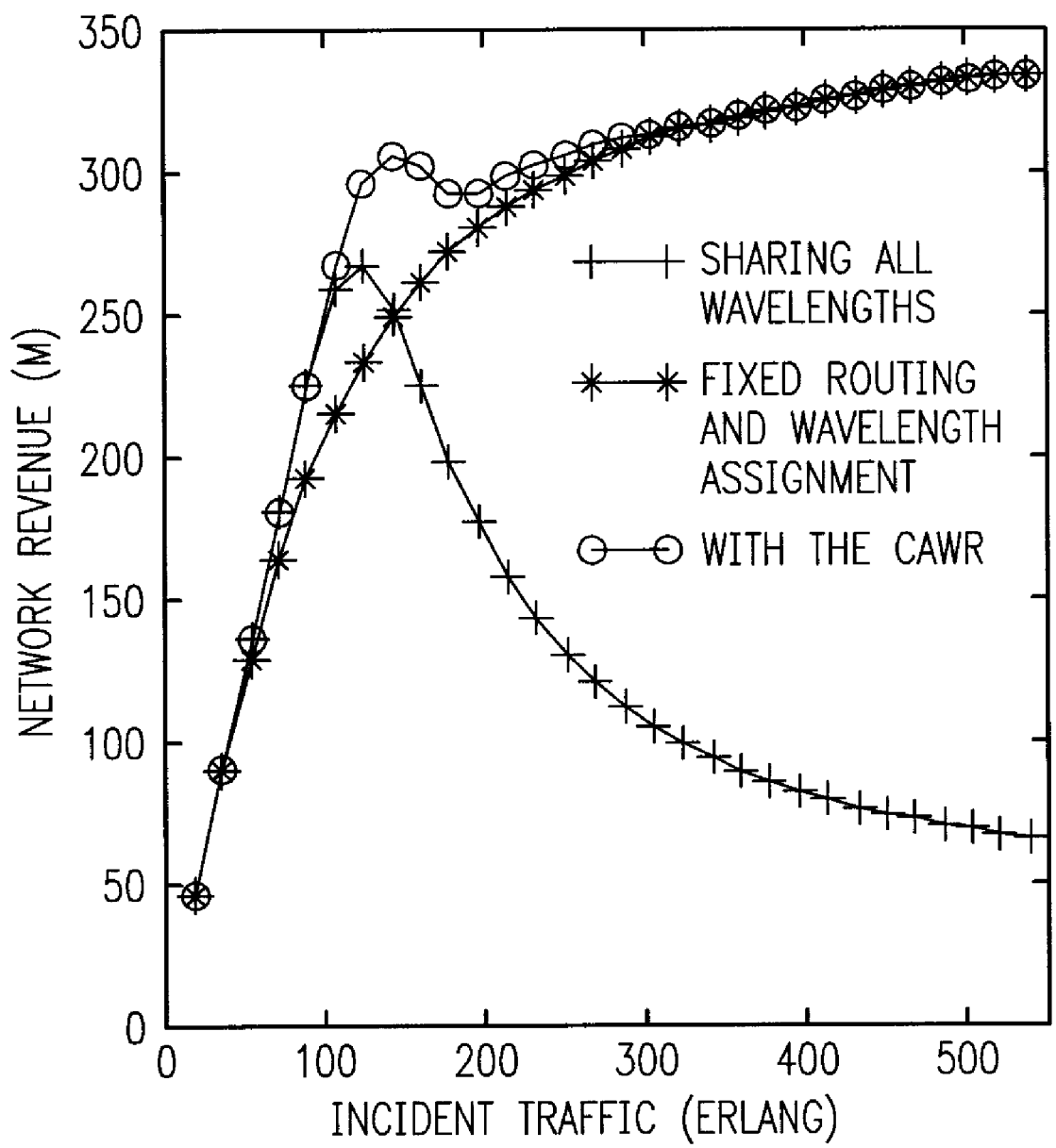
FIG. 31 is a graph of network revenue versus incident traffic with and without the CAWR method.

FIG. 31 shows the network revenue of the ring topology with or without the CAWR method. We see that the network achieves the best revenue under any traffic condition with using the CAWR method.

For the example we considered, FIGS. 29-31 illustrate that the CAWR algorithm results in an increase in the network revenue for all levels of incident traffic while at the same time bringing fairness among all traffic classes.

IV. Conclusion

This embodiment of the invention has presented an algorithm called the Congestion Aware Wavelength Reservation to resolve the fairness problem in a DWDM network with multiple classes of traffic, while at the same time maximizing the throughput of the network and its attendant revenue. This embodiment recognizes three distinct states of the network from the standpoint of congestion. First, under very lightly loaded situations, all wavelengths are available to any traffic request, independent of its destination or class. As the traffic increases, the network resorts to a combination of reserved and unreserved wavelengths for different source-destination pairs, depending upon the level of traffic. This embodiment proposes a heuristic that will lead to an optimal choice for such an assignment. Finally, under very heavily loaded traffic condition, the network resorts to a fixed assignment of all wavelengths to the different source-destination pairs. This assignment, in particular, insures that no traffic is arbitrarily held because of the unavailability of a single link in the designated route, i.e., any traffic that secures a path on the first link will complete its journey to the destination.

Although the foregoing invention has been described in some detail by way of illustration and example for purposes of clarity of understanding, it will be apparent to those skilled in the art that certain changes and modifications may be practiced without departing from the spirit and scope thereof, as described and claimed herein.

REFERENCES

[A-1] J. P. Jue, "Lightpath establishment in wavelength-routed WDM optical networks," in *Optical Networks-Recent Advances*, L. Ruan and D. Z. Du, Eds. Amsterdam, The Netherlands: Kluwer Academic, 2001, pp. 99-122.

[A-2] A. Birman and A. Kershenbaum, "Routing and wavelength assignment methods in single-hop all-optical networks with blocking," in *Proc. IEEE 14th Annu. Joint Conf. INFOCOM '95 Bringing Information to People*, vol. 2, Apr. 2-6, 1995, pp. 431-438.

[A-3] R. A. Barry and P. A. Humblet, "Models of blocking probability in all-optical networks with and without wavelength changers," *IEEE J. Select. Areas Commun.*, vol. 14, June 1996.

[A-4] A. Birman, "Computing approximate blocking probabilities for a class of all-optical networks," in *Proc. IEEE 14th Annu. Joint Conf. INFOCOM '95 Bringing Information to People*, vol. 2, Apr. 2-6, 1995, pp. 651-658.

[A-5] D. Zwillinger, *Standard Mathematical Tables and Formulae*, $30^{th}$ ed. Boca Raton, Fla.: CRC Press, 1996, pp. 335-335.

[A-6] C. Lemieux, "Theory of flow control in shared networks and its application in the Canadian telephone network," *IEEE Trans. Commun.*, vol. COM-29, pp. 399-413, April 1981.

[B-1] Barry R. A, Humblet P. A., "Models of blocking probability in all-optical networks with and without wavelength changers", *IEEE journal on selected areas in communications*, vol. 14 No. 5, pp. 858-867, June 1996.

[B-2] Li Y., Francisco M. J, Lambadaris I., Huang D., "Traffic Classification and Service in Wavelength Routed All-optical Networks", *Communications,* 2003. *ICC '03. IEEE International Conference on,* vol. 2, 11-15, pp. 1375-1380 May 2003.

[B-3] Ellinas G., "Wavelength Assignment Algorithms for WDM Ring Architectures", *Optical Networks-Recent Advances,* L. Ruan and D. Z. Du (Eds.) pp. 19-45.

[B-4] Jue, J. P., "Lightpath Establishment in Wavelength-Routed WDM Optical Networks", *Optical Networks-Recent Advances,* L. Ruan and D. Z. Du (Eds.) pp. 99-122.

[B-5] Birman, A., Kershenbaum, A., "Routing and wavelength assignment methods in single-hop all-optical networks with blocking", *INFOCOM '95. Fourteenth Annual Joint Conference of the IEEE Computer and Communications Societies. Bringing Information to People.* Proceedings. IEEE, vol. 2, 2-6, pp. 431-438, April 1995

[B-6] Gong, Y., Lee, P., and Gu, W., "A Novel Adaptive RWA Algorithm in Wavelength-routed Network", *Global Telecommunications Conference,* 2003. GLOBECOM '03. IEEE, vol. 5, 1-5, pp. 2580-2584, December 2003.

[B-7] Lemieux, C, "Theory of Flow Control in Shared Networks and Its Application in the Canadian Telephone Network", *IEEE Transactions on Communications,* vol. 29, no. 4, pp. 399-413, April 1981.

[B-8] Zang, H., Jue, J. P., and Mukerjee, B., "A review of routing and wavelength assignment approaches for wavelength-routed optical WDM networks", *Optical Networks Magazine,* vol. 1, no. 1, pp. 47-60, January 2000.

[B-9] Ling Li; Somani, A. K., "Dynamic wavelength routing using congestion and neighborhood information", *IEEE/ACM Transactions on Networking,* vol. 7, No. 5, pp. 779-786, October 1999.

[C-1] Barry R. A, Humblet P. A., Models of blocking probability in all-optical networks with and without wavelength changers, *IEEE journal on selected areas in communications,* vol. 14, no. 5, pp. 858-867, June 1996.

[C-2] Li, Y., Francisco M. J, Lambadaris I., Huang D., Traffic Classification and Service in Wavelength Routed All-optical Networks, *Communications,* 2003. ICC '03. IEEE International Conference on, vol. 2, 11-15, pp. 1375-1380, May 2003.

[C-3] Ellinas G., Wavelength Assignment Algorithms for WDM Ring Architectures, *Optical Networks-Recent Advances,* L. Ruan and D. Z. Du (Eds.) pp. 1945, Kluwer Academic Publishers, 2001.

[C-4] Gong, Y., Lee, P., and Gu, W., A Novel Adaptive RWA Algorithm in Wavelength-routed Network, *Global Telecommunications Conference,* 2003. GLOBECOM '03. IEEE, vol. 5, 1-5, pp. 2580-2584, December 2003.

[C-5] Birman, A., Kershenbaum, A., Routing and wavelength assignment methods in single-hop all-optical networks with blocking, *INFOCOM '95. Fourteenth Annual Joint Conference of the IEEE Computer and Communications Societies. Bringing Information to People. Proceedings.* IEEE, vol. 2, 2-6, pp. 431-438, April 1995.

[C-6] Lemieux, C, Theory of Flow Control in Shared Networks and Its Application in the Canadian Telephone Network, *IEEE Transactions on Communications,* vol. 29, no. 4, pp. 399-413, April 1981.

[D-1] Ellinas G., "Wavelength Assignment Algorithms for WDM Ring Architectures", Optical *Networks-Recent Advances,* L. Ruan and D. Z. Du (Eds.) pp. 19-45, Kluwer Academic Publishers, 2001.

[D-2] Jue, J. P., "Lightpath Establishment in Wavelength-Routed WDM Optical Networks", *Optical Networks-Recent Advances,* L. Ruan and D. Z. Du (Eds.) pp. 99-122, Kluwer Academic Publishers, 2001.

[D-3] Birman, A., Kershenbaum, A., "Routing and wavelength assignment methods in single-hop all-optical networks with blocking", *INFOCOM '95. Fourteenth Annual Joint Conference of the IEEE Computer and Communications Societies. Bringing Information to People.* Proceedings. IEEE, Page(s): 431-438 vol. 2, 2-6 Apr. 1995.

[D-4] Barry R. A, Humblet P. A., "Models of blocking probability in all-optical networks with and without wavelength changers", *IEEE Journal on Selected Areas in Communications,* vol. 14 No. 5, June 1996.

[D-5] Zwillinger, D., "Standard Mathematical Tables and Formulae", 30th Edition, pp. 335, CRC press, 1996.

[D-6] H. Zang, J. P. Jue, and B. Mukherjee, "A Review of Routing and Wavelength Assignment Approaches for Wavelength-Routed Optical WDM Networks", *Optical Networks Magazine,* vol. 1, no. 1, pp. 47-60, January 2000.

[D-7] Birman, A., "Computing approximate blocking probabilities for a class of all-optical networks", *INFOCOM '95. Fourteenth Annual Joint Conference of the IEEE Computer and Communications Societies. Bringing Information to People.* Proceedings. IEEE, 2-6 Apr. 1995, Page(s): 651-658 vol. 2.

[D-8] F. P. Kelly, "Blocking Probabilities in Large Circuit-Switched Networks", *Advances in Applied Probability,* pp. 473-505, vol. 18, 1986.

[D-9] Qu, Y., and Verma, P. K., "Limits on the Traffic Carrying Capacity of Optical Networks with an Arbitrary Topology", *IEEE Communications Letters,* pp. 641-643, October 2004.

[E-1] Zang, H., Jue, J. P., and Mukherjee, B., "A review of routing and wavelength assignment approaches for wavelength-routed optical WDM networks", *Optical Networks Magazine,* vol. 1, no. 1, pp. 47-60, January 2000

[E-2] Barry R. A, Humblet P. A., "Models of blocking probability in all-optical networks with and without wavelength changers", *IEEE journal on selected areas in communications,* vol. 14 No. 5, pp. 858-867, June 1996

[E-3] Li Y., Francisco M. J, Lambadaris I., Huang D., "Traffic Classification and Service in Wavelength Routed All-optical Networks", *Communications,* 2003. *ICC '03. IEEE International Conference on,* vol. 2, 11-15, pp. 1375-1380 May 2003

[E-4] Ellinas G., "Wavelength Assignment Algorithms for WDM Ring Architectures", *Optical Networks-Recent Advances,* L. Ruan and D. Z. Du (Eds.) pp. 1945

[E-5] Gong, Y., Lee, P., and Gu, W., "A Novel Adaptive RWA Algorithm in Wavelength-routed Network", *Global Telecommunications Conference,* 2003. GLOBECOM '03. IEEE, vol. 5, 1-5, pp. 2580-2584, December 2003

[E-6] Birman, A., Kershenbaum, A., "Routing and wavelength assignment methods in single-hop all-optical networks with blocking", *INFOCOM '95. Fourteenth Annual Joint Conference of the IEEE Computer and Communications Societies. Bringing Information to People.* Proceedings. IEEE, vol. 2, 2-6, pp. 431-438, April 1995

[E-7] Lemieux, C, "Theory of Flow Control in Shared Networks and Its Application in the Canadian Telephone Network", *IEEE Transactions on Communications,* vol. 29, no. 4, pp. 399-413, April 1981

[E-8] Qu, Y., and Verma, P. K., "Limits on the Traffic Carrying Capacity of Optical Networks with an Arbitrary Topology", *IEEE Communications Letters,* pp. 641-643, October 2004

[E-9] Qu, Y., Verma, P. K., and Cheung, J. Y., "Wavelength Reservation and Congestion Control in Optical Networks", *IASTED international conference on Optical Communica-*

*tion Systems and Networks*, Wireless and Optical Communications proceedings, pp 790-795, July 2004

[E-10] F. P. Kelly, "Blocking Probabilities in Large Circuit-Switched Networks", *Advances in Applied Probability*, pp. 473-505, vol. 18, 1986.

What is claimed is:

1. A method for enhancing the carrying capacity of a network, comprising the steps of:

detecting the level of traffic incident on the network; and routing traffic by classifying traffic requests based upon the number of hops from a source node to a destination node, and providing selective preference to at least one class of traffic having a lesser number of hops relative to another class of traffic when the level of traffic incident on the network reaches a threshold level.

2. A network router for use in routing traffic on a network, the network router comprising:

a processor detecting a level of traffic incident on a network and routing traffic by classifying traffic requests based upon the number of hops from a source node to a destination node, and providing selective preference to at least one class of traffic having a lesser number of hops relative to another class of traffic when the level of traffic incident on the network reaches a threshold level.

3. The network router of claim 2, wherein the at least one class of traffic is selected from the group consisting of single-hop and multiple-hop traffic.

4. The method of claim 1, wherein the at least one class of traffic is selected from the group consisting of single-hop and multiple-hop traffic.

* * * * *

UNITED STATES PATENT AND TRADEMARK OFFICE
CERTIFICATE OF CORRECTION

PATENT NO. : 7,668,135 B2
APPLICATION NO. : 11/114619
DATED : February 23, 2010
INVENTOR(S) : Pramode K. Verma and Yingzhen Qu It is certified that error appears in the above-identified patent and that said Letters Patent is hereby corrected as shown below:

In the References:

Column 32, line 45: After "pp." delete "1945" and replace with -- 19 - 45 --.

Signed and Sealed this

Twentieth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,668,135 B2 Page 1 of 1
APPLICATION NO. : 11/114619
DATED : February 23, 2010
INVENTOR(S) : Verma et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1105 days.

Signed and Sealed this

Twenty-eighth Day of December, 2010

David J. Kappos
*Director of the United States Patent and Trademark Office*